(12) United States Patent
Plotnik et al.

(10) Patent No.: US 6,873,608 B1
(45) Date of Patent: Mar. 29, 2005

(54) COMMUNICATION SYSTEM UTILIZING HOST SIGNAL PROCESSING

(75) Inventors: Eli Plotnik, Kfar Saba (IL); Ophir Shabtai, Haifa (IL)

(73) Assignee: Comsys Communication & Signal Processing LTD, Herzlia (IL)

( * ) Notice: Subject to any disclaimer, the term of this patent is extended or adjusted under 35 U.S.C. 154(b) by 0 days.

(21) Appl. No.: 09/463,957

(22) PCT Filed: Aug. 6, 1998

(86) PCT No.: PCT/IL98/00368

§ 371 (c)(1),
(2), (4) Date: Feb. 3, 2000

(87) PCT Pub. No.: WO99/08456

PCT Pub. Date: Feb. 18, 1999

Related U.S. Application Data

(60) Provisional application No. 60/055,098, filed on Aug. 6, 1997.

(51) Int. Cl.[7] .................................................. H04Q 7/00
(52) U.S. Cl. ........................................ 370/328; 455/426
(58) Field of Search .................................. 455/426, 456, 455/552, 553, 556, 557, 553.1, 76; 345/211; 370/328, 334

(56) References Cited

U.S. PATENT DOCUMENTS

| | | | |
|---|---|---|---|
| 4,965,641 A | | 10/1990 | Blackwell et al. |
| 5,301,366 A | * | 4/1994 | Groshong et al. ............ 455/76 |
| 5,524,047 A | * | 6/1996 | Brown et al. ............ 455/553.1 |
| 5,710,986 A | | 1/1998 | Obayashi et al. |
| 5,794,145 A | | 8/1998 | Milam |
| 5,841,431 A | * | 11/1998 | Simmers ..................... 345/211 |

OTHER PUBLICATIONS

Data Sheet, Phillips Semiconductors Product Specification, "Low–power dual frequency synthesizer for radio communications", UMA1015M, Jun. 22, 1995, p. 7–156.

Data Sheet, Phillips Semiconductors Product Specification, "Low–power dual frequency synthesizer for radio communications", UMA1015M, Jun. 22, 1995, p. 7–143.

Data Sheet, Phillips Semiconductors Product Specification, "Data processor for cellular radio (DPROC2)", UMA1002, Oct. 23, 1995, p. 9–538.

Data Sheet Phillips Semiconductors Objective Specification, "Variable gain RF predriver amplifier", SA910, Nov. 21, 1995, p. 8–43.

(Continued)

*Primary Examiner*—Salvatore Cangialosi
(74) *Attorney, Agent, or Firm*—Eitan, Pearl, Latzer & Cohen Zedek, LLP

(57) ABSTRACT

The system utilizes host signal processing techniques applicable to cellular communication system devices which are integrated with a system incorporating a general purpose CPU running a multitasking operating system. A RF receiver processes the signals to generate a receive signal, the RF module performs RF transmit processing on a transmit signal and generates the transmit wireless signal from it. A host processor communicates data, status and control information with the RF device via a bus, the host processor includes host based software application and a host based modem application. The receive signal generated by the RF module over the bus and generates receive data in response to it input to the software application at a output by the software application is received and generates the transmit signal in response to it, sending the transmit signal to the RF module over the bus. The figure shows a block diagram illustrating an analog cellular communications systems tuned for data communication.

41 Claims, 11 Drawing Sheets

OTHER PUBLICATIONS

Data Sheet, Phillips Semiconductors Product Specification, "1GHz low voltage LNA and mixer", SA611, Nov. 15, 1996, p. 4–31.

Data Sheet, Phillips Semiconductors Product Specification, "Low–voltage high performance mixer FM IF system", SA606, Oct. 26, 1993, p. 6–101.

Data Sheet, Phillips Semiconductors Product Specification, "Audio processor—filter and control section", SA5753, p. 9–63.

Data Sheet, Phillips Semiconductors Product Specification, "Low voltage 8–bit microcontrollers", P83CL781; P83CL782, Jul. 13, 1995, p. 12–75.

Data Sheet, Phillips Semiconductors System Solutions, "AMPS/(E)TACS/CDPD Analog Cellular", Jan. 1997, p. 3–7.

Data Sheet, Phillips Semiconductors Product Specification, "Low voltage mono/stereo power amplifier", TDA7050T, Jul. 1994, p. 8–85.

William C. Y. Lee, "Mobile Communications Engineering", Second Edition, McGraw Hill, Inc., 1998, pp. 327–345.

William C. Y. Lee, "Mobile Communications Engineering", Second Edition, McGraw Hill, Inc., 1998, pp. 347–395.

John G. Proakis, "Digital Communications", Second Edition, McGraw Hill, Inc., 1989, pp. 518–701.

John G. Proakis, "Digital Communications", Second Edition, McGraw Hill, Inc., 1989, pp. 220–359.

\* cited by examiner

COMMUNICATION SYSTEM UTILIZING HOST SIGNAL PROCESSING

This application claims the benefit of No. 60/055,098 filed Aug. 6, 1997.

FIELD OF THE INVENTION

The present invention relates generally to wireless communications systems and more particularly relates to wireless communications systems utilizing Host Signal Processing (HSP).

BACKGROUND OF THE INVENTION

In recent years there has been explosive growth in the number of wireless devices in use. In fact, the rate of growth of wireless devices is increasing at a very fast rate. The increased use of wireless devices includes all types of portable computers, mobile computers, hand-held computers, so called personal digital assistants (PDAs) and numerous types of electronic organizers. Accompanying this increase in the use of wireless devices in an increasing demand for mobile data/voice services for use with these devices that is both flexible and simple.

A portion of these wireless devices can be considered 'host systems' from the viewpoint of the functionality and services they provide to a user. The host system can be connected to a regular conventional cellular handset via a cable or an integrated cellular communication system (CCS) and can be used for both voice and data. Many of the wireless devices available today are able to deploy some kind of data application. As a result of this, some cellular data services, in some cases, do not include voice capabilities.

In the case of an analog cellular communication system (ACCS), data is transferred by transmitting the analog signal generated by a voice band modem (e.g., V.32 bis). In the case of a digital CCS data is transferred by multiplexing the data bits to be transmitted into the bit stream and transmitting them through the digital modem.

Conventional cellular communications systems are typically implemented using dedicated hardware such as shown in FIG. 1. The cellular subscriber unit, generally referenced 10, is typical of prior art devices. The hardware making up the subscriber unit 10 performs several tasks including analog or digital cellular modem functions, analog voice band modem functions and performing voice codec functions. These functions are performed in part by a dedicated digital signal processor (DESP) that is part of the baseband module. The software for the DSP is stored in memory 20 which comprises read only memory (ROM).

There are several disadvantages to the implementation of the subscriber unit 10 described above. One disadvantage is that a cellular subscriber unit implementation that is based on dedicated hardware increases the cost of the finished product. Using dedicated hardware also increases the power consumption of the device which is increasingly a critical issue in the mobile devices market. There is tremendous pressure to design wireless products that are more powerful, provide increased functionality in a smaller size, utilize less power and have greatly increased battery life.

Another factor that is critical with cellular subscriber units is their physical size, wherein extra hardware crammed into the device, causing its dimensions to increase, is not desirable.

Yet another feature that is critical with cellular subscriber devices is the flexibility within a single device to work with different cellular standards Additional hardware is often necessary in order to achieve this goal. Adding data handling capabilities to an analog CCS via voice band modems requires additional hardware. This increases the cost of the unit in addition to increasing its size and power consumption.

A feature that is desirable in subscriber units is the ability to upgrade in a flexible manner. It is also desirable to be able to support multiple products within a product line using the same hardware. For example, the subscriber can be constructed to support a specific cellular standard, voice only, data only or voice plus data The ability to provide a flexible upgrade capability may be difficult if the hardware and firmware is fixed as is the case in conventional cellular subscriber units.

Another drawback to using the hardware implementation for the cellular subscriber unit is the difficulty in implementing complex modem techniques that serve to improve performance in connection with high speed data services, for example. Implementing complex modem techniques in hardware will impose additional cost, size and power consumption limitations.

SUMMARY OF THE INVENTION

The present invention overcomes the difficulties imposed by prior art cellular subscriber units by implementing a significant portion of the various processing tasks required to implement the cellular standard on a general purpose central processing unit (CPU). The CPU is typically within the host system and utilizes a technology known as Host Signal Processing (HSP) to implement the processing tasks. The novel cellular subscriber unit implementation of the present invention functions to reduce the amount of dedicated hardware required and functions to increase the flexibility available in implementing devices that support (1) several cellular standards, i.e., multi mode operation (2) different software versions for the sane hardware (3) easy upgradability and (4) complex implementation techniques.

The present invention can be used to alleviate the problems discussed hereinabove in the implementation of a cellular communication system. The problems the present invention overcome include the high cost of the dedicated hardware that has been used in the prior art. The invention implements the various processing tasks and hardware functionality needed to reliably support different standards within a single product with the addition of data handling capabilities without requiring additional hardware.

The implementation of a cellular communication system presented herein utilizes host signal processing. The use of host signal processing effectively transfers many of the processing tasks from the dedicated hardware used in conventional cellular subscriber units to the general purpose CPU in the host system of the present invention. The solution presented herein provides an architecture that is adapted to meet the specific impairments of typical cellular environments.

Cellular communication systems are divided into two main categories: analog cellular communication systems (ACCS) and digital cellular communication systems (DCCS). Note that the term ACCS or DCCS represent broad categories of cellular systems. The term ACCS refers to a cellular system in which the analog voice signal is modulated using an analog modulation technique, e.g., FM modulation as in the AMPS cellular communication standard. The term ACCS may include, but is not limited to, AMPS, TACS, ETACS, JTAC, NTACS, NAMPS, NTT, NMT and C450 (Germany). The term DCCS refers to a cellular system in which the voice signal is coded in a digital fashion into a stream of bits. These bits are transmitted utilizing a digital modem, e.g., GMSK modulation as in the GSM cellular standard. The term DCCS may include, but is not limited to, GSM, TDMA, CDMA and PCS.

Both analog and digital cellular communication systems can be used to transmit and receive both voice and data. In the analog cellular communication systems, the data baseband signal is defined by one of the line modem standards, e.g., V.32bis, V.34, V.90, etc., and data is transferred either by transmitting the analog signal from a voice band modem through the analog system portion or by using a packet switching standard known as CDPD. The demodulation process is performed in two stages: (1) the wireless signal is demodulated to produce the baseband data signal and then (2) the appropriate standard line modem algorithm is applied so as to generate the data bits. In addition, analog cellular communication systems also comprise a digital modem for the control channel (data and signaling unit 88 in FIG. 3). One example is the FSK modem that is employed in the AMS cellular standard.

In digital cellular communication systems, the wireless signal is directly modulated by the data bits and no line modulation is involved. Data is transferred by multiplexing the data bits into the bit stream and transmitting them through a digital modem.

The present invention utilizes host signal processing within a cellular communication system that is adapted to utilize a general purpose CPU. In the case of an analog cellular communication system, examples of the tasks that can be implemented utilizing HSP include: voice band data modems, the baseband portion of the analog modem, the digital modem for the control channel and the speaker phone (if such functionality is incorporated into the system).

In the case of a digital cellular communication system, examples of the tasks that an be implemented include: the baseband portion of the digital modem or parts thereof nd the voice codec.

In addition, in both analog and digital types of cellular communication systems, he protocol stack can be implemented on the general purpose CPU of the host computer.

Further, the invention provides a solution to enhance the performance of the receiver portion of the modem. This is highly desirable in many data applications that are currently in use today, some of which were mentioned hereinabove, and in those applications that will be developed in the future.

It is important to note that the cellular communication system of the present invention has applications to both analog and digital cellular systems.

There is provided in accordance with the present invention a cellular communication system comprising antenna apparatus for transmitting a transmit wireless signal, the antenna apparatus for receiving a receive wireless signal, radio frequency (RF) means for receiving and performing RF receive processing on the receive wireless signal to generate a receive signal, the RF means for performing RF transmit processing on a transmit signal and generating the transmit wireless signal therefrom, host processing means adapted to communicate data, status and control information with the RF means via a bus, the host processing means comprising host based software application and a host based modem application, the host based modem application performing the method comprising the steps of receiving the receive signal generated by the RF module over the bus and generating receive data in response thereto for input to the software application and receiving data output by the software application and generating the transmit signal in response thereto, sending the transmit signal to the RF module over the bus.

There is also provided in accordance with the present invention a cellular communication system comprising a plurality of antennas for receiving a plurality of receive wireless signals, one of the plurality of antennas for transmitting a transmit wireless signal, radio frequency (RF) means for receiving and performing RF receive processing on the plurality of receive wireless signals to generate a plurality of receive signals, the RF means for performing RF transmit processing on a transmit signal and generating the transmit wireless signal therefrom, host processing means adapted to communicate data, status and control information with the RF means via a bus, the host processing means comprising host based software application and a host based modem application, the host based modem application performing the method comprising the steps of receiving the plurality of receive signals generated by the RF module over the bus and generating receive data in response thereto for input to the software application and receiving data output by the software application and generating the transmit signal in response thereto, sending the transmit signal to the RF module over the bus.

The RF receive processing comprises RF demodulation of the receive wireless signal and wherein the receive signal comprises a receive audio baseband signal. The RF receive processing comprises downconversion of the receive wireless signal and wherein the receive signal comprises an intermediate frequency (IF) signal. The RF receive processing comprises downconversion of the receive wireless signal and wherein the receive signal comprises complex baseband I and Q signals.

The transmit signal comprises an audio baseband signal and wherein the RF transmit processing comprises RF modulation to the transmit wireless signal. The transmit signal comprises an intermediate frequency (IF) signal and wherein the RF transmit processing comprises upconversion to the transmit wireless signal. The transmit signal comprises complex baseband I and Q signals and wherein the RF transmit processing comprises upconversion to the transmit wireless signal. The host based modem application implements a cellular protocol.

The host based modem application is operative to generate the receive data in response to the receive signal generated by the RF module and to send the transmit signal to the RF module over the bus in accordance with predetermined signal processing methods. The host based modem application is operative to generate the receive data in response to the plurality of receive signals generated by the RF module and to send the transmit signal to the RF module over the bus in accordance with predetermined signal processing methods.

The signal processing method comprises the steps of receiving an audio baseband signal, de-interleaving the audio baseband signal, performing diversity combining functions, performing equalization functions, performing modem demodulation functions and decoding the results of the modem demodulation. The signal processing method comprises the steps of receiving an IF sampled signal, de-interleaving the IF sampled signal, performing diversity combining functions, demodulating the IF sampled signal to an audio baseband signal, performing equalization functions, performing modem demodulation functions and decoding the results of the modem demodulation. The signal processing method comprises the steps of receiving complex baseband I and Q signals, de-interleaving the complex baseband I and Q signals, performing diversity combining functions, demodulating the complex baseband I and Q signals to an audio baseband signal, performing equalization functions, performing modem demodulation functions and decoding the results of the modem demodulation.

The signal processing method comprises the steps of receiving a transmit data signal, encoding the transmit data signal, performing modem modulation functions, performing cellular audio processing functions to yield an audio baseband signal, interleaving the results of the cellular audio processing and transmitting the interleaved audio baseband signal. The signal processing method comprises the steps of receiving a transmit data signal, encoding the transmit data signal, performing modem modulation functions, performing cellular audio processing functions, performing IF modulation functions to yield an IF sampled signal, interleaving the results of the IF modulation and transmitting the interleaved IF sampled signal. The signal processing method comprises the steps of receiving a transmit data signal, encoding the transmit data signal, performing modem modulation functions, performing cellular audio processing functions, performing I and Q modulation functions to yield complex baseband I and Q signals, interleaving the results of the I and Q modulation and transmitting the interleaved complex baseband I and Q signals.

The RF means comprises RF circuitry implemented on a printed circuit board (PCB) adapted to be installed in a computer or comprises RF circuitry implemented on a PCMCIA card adapted to be installed in a computer. The bus comprises bus interface circuitry implemented on a printed circuit board (PCB) adapted to be installed in a computer.

The RF means comprises an external cellular transceiver coupled to a computer via a cable, the cable operative to connect the external cellular transceiver to bus interface circuitry within the computer. The bus interface circuitry comprises a serial port or comprises a parallel port.

The RF means comprises an external cellular transceiver coupled to a computer via a cable, the cable operative to connect the external cellular transceiver to a parallel port within the computer. The host based modem application implements diversity combining for combining the plurality of receive audio baseband signals. The host based modem application implements diversity combining means for combining the plurality of receive IF signals. The host based modem application implements diversity combining means for combining the plurality of receive complex baseband I and Q signals.

In addition, there is provided in accordance with the present invention a cellular communication system comprising a host comprising processing means adapted to execute one or more software applications including a software application adapted to communicate data, a device driver adapted to handle data transfers, configuration operations and the linking of low level physical entities within hardware interface circuitry to the host, the hardware circuitry comprising antenna apparatus for transmitting a transmit wireless signal and for receiving one or more receive wireless signals, radio frequency (RF) means for receiving and processing the one or more receive wireless signals to generate one or more receive signals, the RF means for modulating a transmit signal and generating the transmit wireless signal therefrom, the RF means transmitting the transmit wireless signal, bus circuitry for interfacing data, status and control information between the RF means and a host, wherein the host is adapted to communicate the data, status and control information to and from the RF means via the bus circuitry, the host suitably programmed to implement a host based modem comprising a front end operative to process samples received from the device driver, perform diversity combining, filtering, demodulation and decimation functions and a data pump operative to implement one or more standard voice band modems.

The RF means is adapted to receive and demodulate the one or more receive wireless signals to generate one or more receive baseband signals. The RF means is adapted to receive and downconvert the one or more receive wireless signals to generate one or more receive complex baseband I and Q signals. The RF means is adapted to receive and downconvert the one or more receive wireless signals to generate one or more receive intermediate frequency (IF) signals. The RF means is adapted to modulate an audio baseband signal to yield the transmit wireless signal therefrom. The RF means is adapted to upconvert complex baseband I and Q signals to yield the transmit wireless signal therefrom. The RF means is adapted to upconvert an intermediate frequency (IF) sampled signal to yield the transmit wireless signal therefrom.

The antenna apparatus comprises a plurality of antennas for receiving a plurality of receive wireless signals. The front end and the data pump are implemented utilizing host signal processing (HSP). The host based modem is adapted to implement a cellular protocol. The front end is adapted to perform diversity combining when the antenna apparatus is operative to receive a plurality of receive wireless signals.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
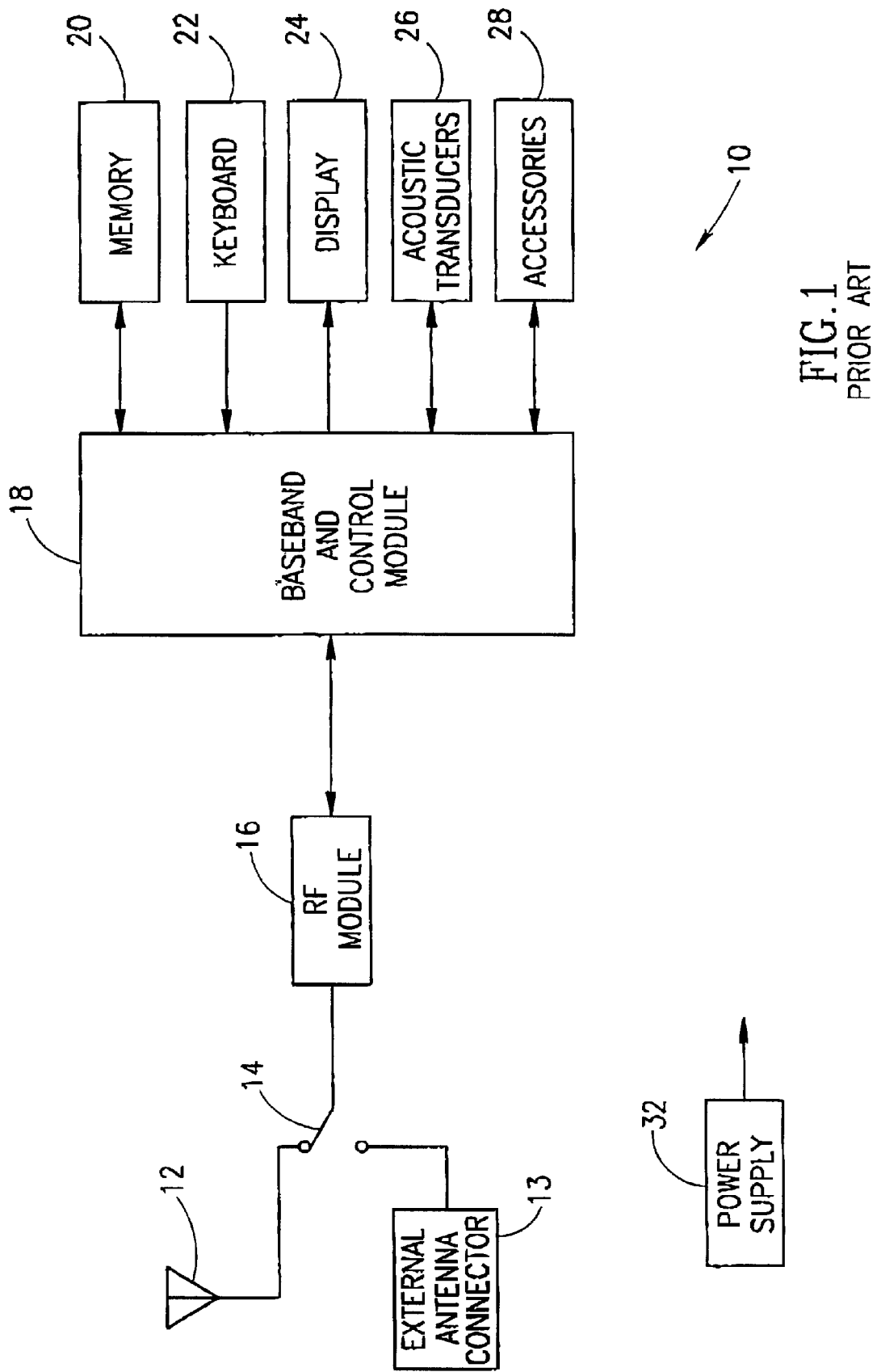
FIG. 1 is a block diagram illustrating a conventional prior art cellular subscriber unit.

The following notation is used throughout this document.

| Term | Definition |
|---|---|
| ACCS | Analog Cellular Communication System |
| AFC | Automatic Frequency Control |
| AMPS | Advanced Mobile Phone System |
| BER | Bit Error Rate |
| BPF | Band Pass Filter |
| CASP | Cellular Audio Signal Processor |
| CCS | Cellular Communication System |
| CDMA | Code Division Multiple Access |
| CDPD | Cellular Data Packet Data |
| CPU | Central Processing Unit |
| DAA | Data Access Arrangement |
| DCCS | Digital Cellular Communication System |
| DFE | Decision Feedback Equalization |
| DMA | Direct Memory Access |
| DSP | Digital Signal Processor |
| DTMF | Dual Tone Multiple Frequency |
| EQM | Error Quality Measurement |
| FIFO | First In First Out |
| FIR | Finite Impulse Response |
| FM | Frequency Modulation |
| FSK | Frequency Shift Keying |
| GMSK | Gaussian Minimum Shift Keying |
| GSM | Global System for Mobile communication |
| GUI | Graphical User Interface |
| HSP | Host Signal Processing |
| IF | Intermediate Frequency |
| ISA | Industry Standard Architecture |
| ISI | Intersymbol Interference |
| ITU | International Telecommunications Union |
| LNA | Low Noise Amplifier |
| MAC | Media Access Control |
| NAMPS | Narrowband Advanced Mobile Phone System |
| NMT | Nordic Mobile Telephone System |
| OS | Operating System |
| PC | Personal Computer |
| PCB | Printed Circuit Board |
| PCI | Peripheral Component Personal Computer Interconnect |
| PCMCIA | Personal Computer Memory Card International Association |
| PCS | Personal Communication Services |
| PDA | Personal Digital Assistant |
| PLL | Phase Lock Loop |
| PSTN | Public Switched Telephone Network |
| RF | Radio Frequency |
| ROM | Read Only Memory |
| RSSI | Received Signal Strength Indication |
| SAT | Supervisory Audio Tone |
| SNR | Signal to Noise Ratio |
| ST | Signaling Tone |
| TACS | Total Access Communication System |
| TCXO | Temperature Controlled Crystal Oscillator |
| TDMA | Time Division Multiple Access |
| USB | Universal Serial Bus |
| VCO | Voltage Controlled Oscillator |

General Description

To aid in illustrating the principles of the present invention, the cellular communication system is described in the context of the Advanced Mobile Phone System (AMPS) cellular standard. Note that the AMPS cellular standard embodies (1) the subscriber unit specification EIA/IS-19B, (2) the land unit specification EIA/IS-20A and (3) the control and compatibility definition specification EIA/TIA-553. The use of the AMPS cellular standard as an example throughout this document does not in any way limit the scope of the present invention. Realizing the present invention for other cellular standards such as Narrowband Advanced Mobile Phone System (NAMPS), Total Access Communication System (TACS), a combination of these in a dual mode device or in accordance with other standards is substantially similar to realizing it in the AMPS cellular standard Therefore, the principles described below in connection with the AMPS standard is equally applicable for other standard such as NAMPS and TACS even though the description presented hereinbelow refers to the AMPS standard. In addition, one skilled in the cellular communication arts would be able to apply the principles of the present invention to any analog or digital cellular communication system.

Further details on cellular communications and multiple access technologies can be found in William C. Y. Lee, Mobile Communications Engineering, Second Edition, McGraw Hill, Inc., 1998 and in John G. Proakis, Digital Communications, Second Edition, McGraw Hill, Inc., 1989.

The following definitions apply throughout this document. The receive wireless signal is the signal received by an antenna. The transmit wireless signal is the signal transmitted by the antenna. The term RF demodulation is used to denote demodulation of a receive wireless signal to an audio baseband signal. The term downconversion to IF denotes the frequency downconversion of a receive wireless signal to an IF signal. The term downconversion to I and Q denotes frequency downconversion of a receive wireless signal to complex baseband I and Q signals.

The term IF demodulation denotes the demodulation of an IF signal to either complex baseband I and Q signals or to an audio baseband signal. The term modem demodulation denotes the demodulation of either complex baseband I and Q signals or a audio baseband signal to data bits.

Note that the terms denoting the reverse process, i.e., modulation and upconversion, are defined in a converse manner to those listed above.

The term cellular transceiver is defined as any apparatus having one or more antennas and RF circuitry that is capable of receiving and transmitting a wireless cellular signal. The term cellular protocol denotes the compatibility specification permitting a mobile station and a land station to communicate with each other. An example of a cellular protocol for the AMPS cellular standard is defined in the EIA/IS-19B, EIA/IS-20A and EIA/TIA-553 specifications.

The term host is defined as any computing platform or computing means having a combination of hardware and software that permits one or more software processes to execute in a non dedicated manner. An example of a host is a personal computer running an operating system permitting a software communications application to run concurrently with a host based modem application.

Figure 2:
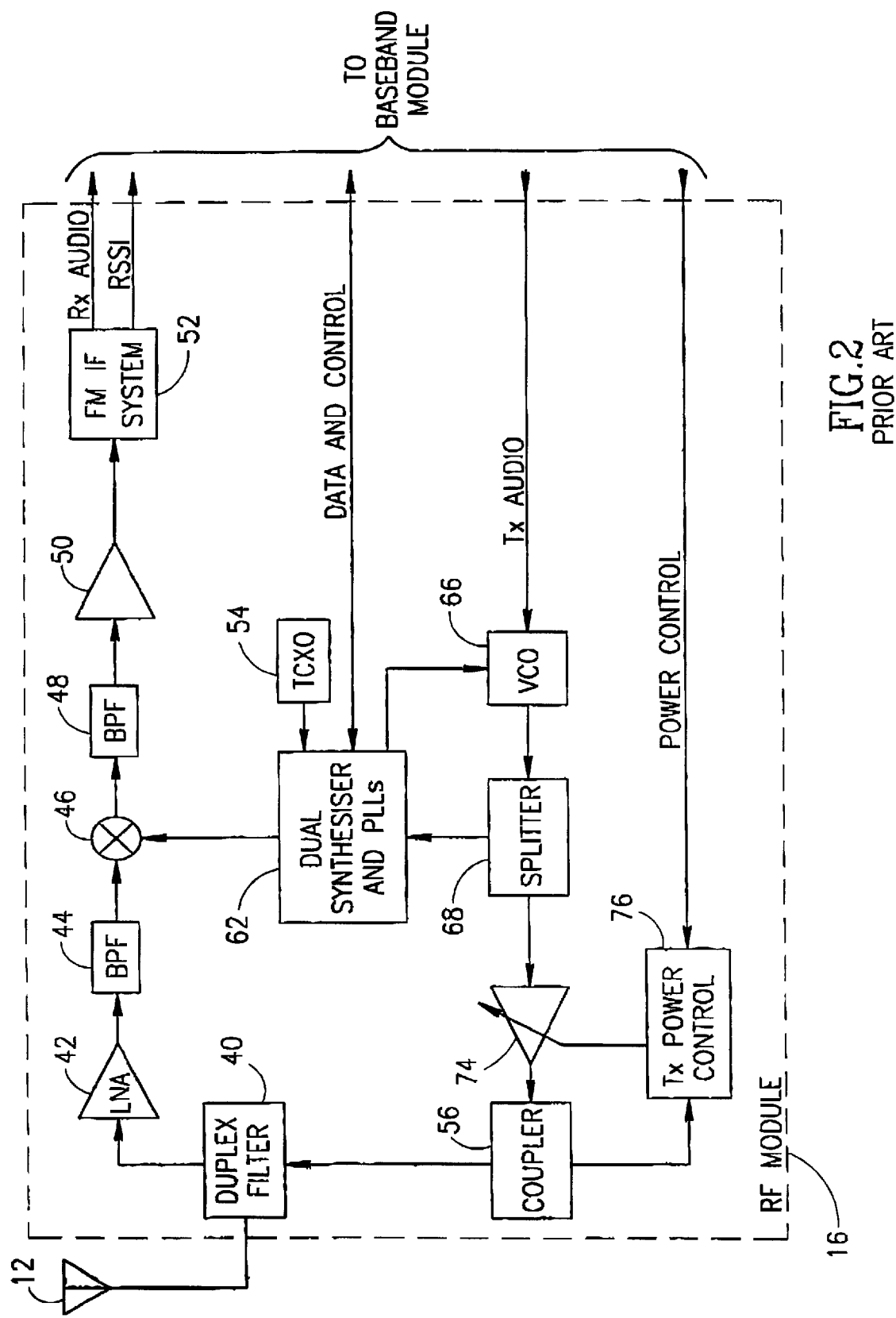
FIG. 2 is a block diagram illustrating the components of the RF module of a conventional cellular subscriber unit in more detail.
Figure 3:
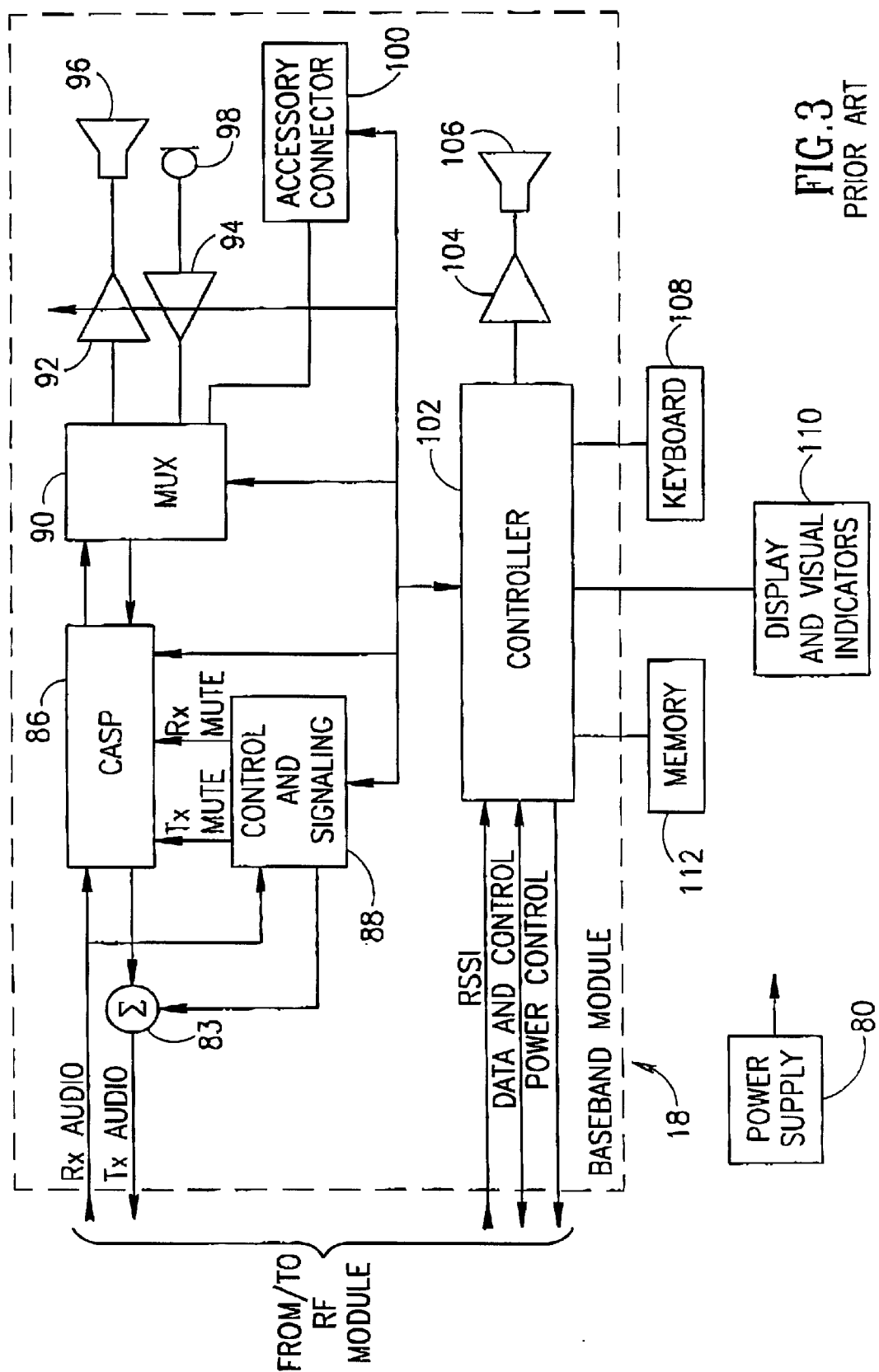
FIG. 3 is a block diagram illustrating the baseband processing elements of a prior art cellular subscriber unit in more detail.

A conventional prior art cellular subscriber unit is shown in FIGS. 1 through 3. With reference to the block diagram illustrated in FIG. 1, the subscriber unit, generally referenced 10, is a realization of a conventional 800 MHz AMPS compatible subscriber unit whose analog and digital signal processing and control functions are implemented using dedicated hardware components. Note that the example shown in FIGS. 1 through 3 are also applicable to other subscriber units such as NAMPS or TACS.

The RF interface comprises an antenna 12 coupled to an antenna switch 14. The switch 14 couples either the internal antenna 12 or an external antenna connector 13 to the RF module 16. The RF module receives the IF transmit signal from, and sends the IF receive signal to the baseband and control module 18 which functions to convert the IF signal to an audio signal and perform audio signal processing thereon. The RF module performs Frequency Modulation (FM) of the applied audio signal for transmission and also performs FM demodulation for receiving Coupled to the baseband and control module 18 are memory 20, keyboard 22, display 24, acoustic transducers 26 and accessories 28. The acoustic transducers include the ringer, microphone, speaker, etc. Accessories include, for example, a connection for a hands free speakerphone, charging feature, etc. The baseband and control module 18 functions to control the keyboard 22, display 24, acoustic transducers 26 and accessories 28 (i.e., the peripherals). The baseband and control module 18 also provides the control logic of a cellular call, the signals processing functions required by the standard, the electronic interface and the buffering that is required by the peripherals and user oriented functions such as display handling, keyboard input, light outputs, telephone directory feature, etc.

The baseband and control unit 18 also provides management and administrative functions for the subscriber unit 10. In addition, power supply 32 generates the various supply voltages used by the hardware in the subscriber unit 10. The baseband and control module 18 controls the idle and active supply currents generated by the power supply 32 for the subscriber unit 10 so as to yield an efficient low power hand held device.

A block diagram illustrating the components of the RF module of a conventional cellular subscriber unit in more detail is shown in FIG. 2. The RF module 16 comprises a receiver portion and a transmitter portion. In the receiver portion, the signal from the antenna 12 passes through the duplex filter 40 to the low noise amplifier 42. The output signal of the LNA 42 is filtered by band pass filter (BPF) 44 and then mixed via mixer 46 with a synthesized local oscillator signal generated by the dual synthesizer 62 to yield the first IF signal which is a narrow band signal typically centered around 40 or 45 MHz. A temperature compensated crystal oscillator (TCXO) 54 provides a frequency reference for the synthesizer and PLLs 62.

A band pass filter 48 functions to reduce the harmonics and images of the output of the mixer 46. The output of the filter 48 is then buffered by buffer amplifier 50 and fed to the FM IF system 52. The FM IF system 52 comprises a mixer that is used in combination with a local oscillator signal to downconvert the received signal into the second IF frequency which is typically approximately 455 KHz. The signal is then amplified, filtered and clipped by a hard limiter. The constant envelope clipped signal is demodulated in the FM IF system 52 by, for example, a quadrature detector to generate an audio or voice frequency signal. In addition to generating the received audio signal, the FM IF system 52 generates a Received Signal Strength Indication (RSSI) output signal.

The transmit portion of the RF module 16 will now be described in more detail. The audio signal to be transmitted, output from the baseband module, is input to the voltage controlled oscillator (VCO) 66. The VCO 66 functions to generate an output signal whose frequency is modulated by the audio signal. The output of the VCO is an FM signal that is centered around the transmit carrier. The generated FM signal passes through splitter 68 to the input of gain controlled power amplifier 74. The output of the power amp 74 is input to the duplexer/filter 40 after passing through coupler 56. The duplexer/filter is connected to the antenna 12. The coupler 56 feeds a portion of the transmit signal to the Tx power control 76. The transmit power is controlled by the coupler feedback to the Tx power control 76 which is controller by the power control signal from the baseband module.

The dual synthesizer and PLL module 62 functions to synthesize the channel carrier frequencies in accordance with the cellular network channel allocation. The TCXO 54 is used as a time basis for frequency synthesis. Automatic frequency control (AFC) circuitry within the module 62 functions to lock and fine tune the signal. This results in the locking of the receiver down converter to the actual transmitted carrier frequency of the base station. The frequency output of the transmitter VCO 66 frequency is synthesized using a fixed frequency shift between the received and transmitted carrier frequencies. The transmit carrier is locked using a PLL in the synthesizer block utilizing feedback provided by the splitter 24.

The baseband module portion of the prior art cellular subscriber unit will now be described in more detail. A block diagram illustrating the baseband processing elements of a prior art cellular subscriber unit in more detail is shown in FIG. 3. The receive audio signal from the RF module is input to the cellular audio signal processor (CASP) unit 86 and the control and signaling unit 88.

The transmit audio signal from the CASP 86 is summed with the transmit output signal from the control and signaling unit 88 via adder 83. The output of the adder 83 constitutes the transmit audio signal that is input to the RF module. The control and signaling unit 88 functions to communicate with the base station in accordance with the particular cellular protocol in use. It generates both control and signaling audio tone signals and to receive the receive audio signal in parallel with the CASP for control and signaling purposes. The signals output from the control and signaling unit are combined with the voice audio signal output of the CASP 86 in accordance with the cellular standard.

The data and signaling information is output by the control and signaling unit 88 to the controller 102 over the bus connecting the two. The control and signaling unit 88 performs modulation and demodulation functions as required to generate the receive control and signaling information, typically in accordance with a cellular standard, e.g., AMPS, and one or more modem standards.

The CASP unit 86 provides the audio signal processing functionality in accordance with the requirements of the cellular protocol used. The audio signal output of the CASP unit is routed by the multiplexor 90 to acoustic transducers via amplifiers 92, 94 or to an accessory connector 100. The acoustic transducers comprise a microphone 98 and a speaker 96.

The controller 102 provides control functions to peripherals comprising keyboard 108, display and visual indicator 110 and buzzer 106 via driver 104. In addition, the controller 102 performs channel allocation and control functions and serves to generate and/or receive signaling and control signals, power control signals and an RSSI signal sent to/from the RF module 16 (FIG. 2). Further, the controller provides control functionality for the data and signaling block 88, CASP unit 86, multiplexor 90, amplifiers 92, 94 and accessory connector 100. The software for the controller, which typically comprises a processor, is stored in a memory device 112, e.g., ROM, EPROM, EEPROM, Flash, etc. The interface with the user is managed by the controlled via the buzzer 106, keyboard or keypad 108 and display and visual indicators 110.

Note that the RF and baseband portions of the prior art subscriber unit can be constructed using available integrated circuits such as UMA1015 low power dual frequency synthesizer, UMA1002 control data and signaling, P83CL580 microcontroller, AS910 variable gain pre-driver amplifier, SA611 low voltage LNA and mixer, SA606 high performance mixer FM IF system and the SA5752 and SA5753 audio processors manufactured by Phillips Semiconductors.

Cellular Subscriber Unit Utilizing Host Signal Processing

Figure 4:
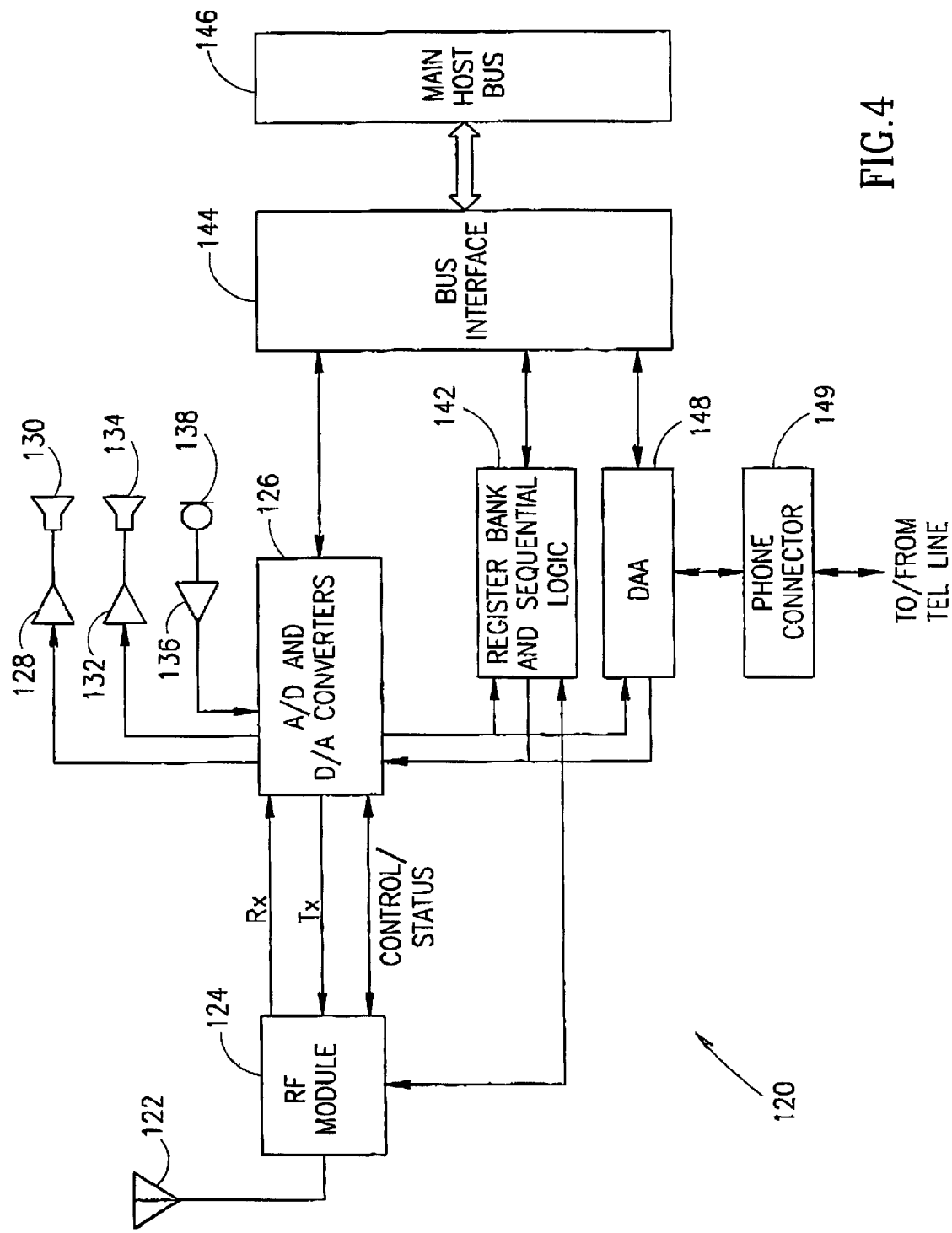
FIG. 4 is a block diagram illustrating the hardware elements of a cellular subscriber unit utilizing host signal processing and constructed in accordance with a first embodiment of the present invention.

A block diagram illustrating the elements of a cellular subscriber unit utilizing host signal processing and constructed in accordance with a first embodiment of the present invention is shown in FIG. 4. The present invention is a cellular subscriber unit wherein most of the baseband tasks, services and signal processing are transferred to and carried out on the host system CPU. Transferring these functions to the host CPU provides power save capabilities, increases flexibility, reduces cost, simplifies upgrades, enhances the user interface (e.g., windows), etc. As shown in FIG. 4, the hardware requirements of the baseband portion is reduced to A/D and D/A converters 126, register bank and sequential logic unit 142 and bus interface 144.

The RF module 124 comprises interfaces for audio signals and other baseband analog signals. These signals are connected to the A/D and D/A converters 126 and to digital control lines that are latched by register bank 142. The RF module 124 implements the high frequency functionality that cannot be performed in software by the host CPU, e.g., frequency modulation to 800 MHz, generation of the local oscillator signal, etc. The RF module 124 is functionally equivalent to the RF module 16 shown FIG. 2 with the following difference: the discriminator in the FM IF system 52 is realized in software. Note that the IF functionality of the FM IF system 52 remains implemented in hardware.

The A/D and D/A converter 126 module is managed via the bus interface 144 block. The converter module functions to convert between digital sample streams and real analog signals. The primary signals that are converted include the audio frequency signals (or their modulated IF forms, or their modulated baseband complex I and Q form representation), the signals related to the acoustic transducers which include speaker 134 and microphone 138, the signal related to the buzzer 130, receive and transmit signals into and out of the data access arrangement (DAA) from the Public Switch Telephone Network (PSTN) telephone line via phone connector 149, signals from power dissipation sensors, RSSI, analog RF feedback loops and adjustment signals to the RF module.

The register bank and sequential logic module 142 latches the control signals for the RF module 124 and comprises sequential logic elements, e.g., counters, gates, etc., that are needed for continuous operation of the RF portion of the device. The bus interface 144 implements the specific bus protocol in accordance with the particular main host bus 146 utilized, e.g., PCMCIA, ISA, PCI, USB, etc. The host bus may include direct memory access (DMA) and interrupt support in accordance with the specific bus specification. An optional DAA 148 functions to conduct calls over the PSTN in the ground line mode for more reliable, faster, better quality and cheaper voice and data communications.

In a device that handles data only and not voice and whereby the audio functionality is realized by a host computer, the acoustic transducers, i.e, buzzer 130, speaker 134, microphone 138 may be omitted from the hardware platform thus saving energy, space and cost.

Figure 5:
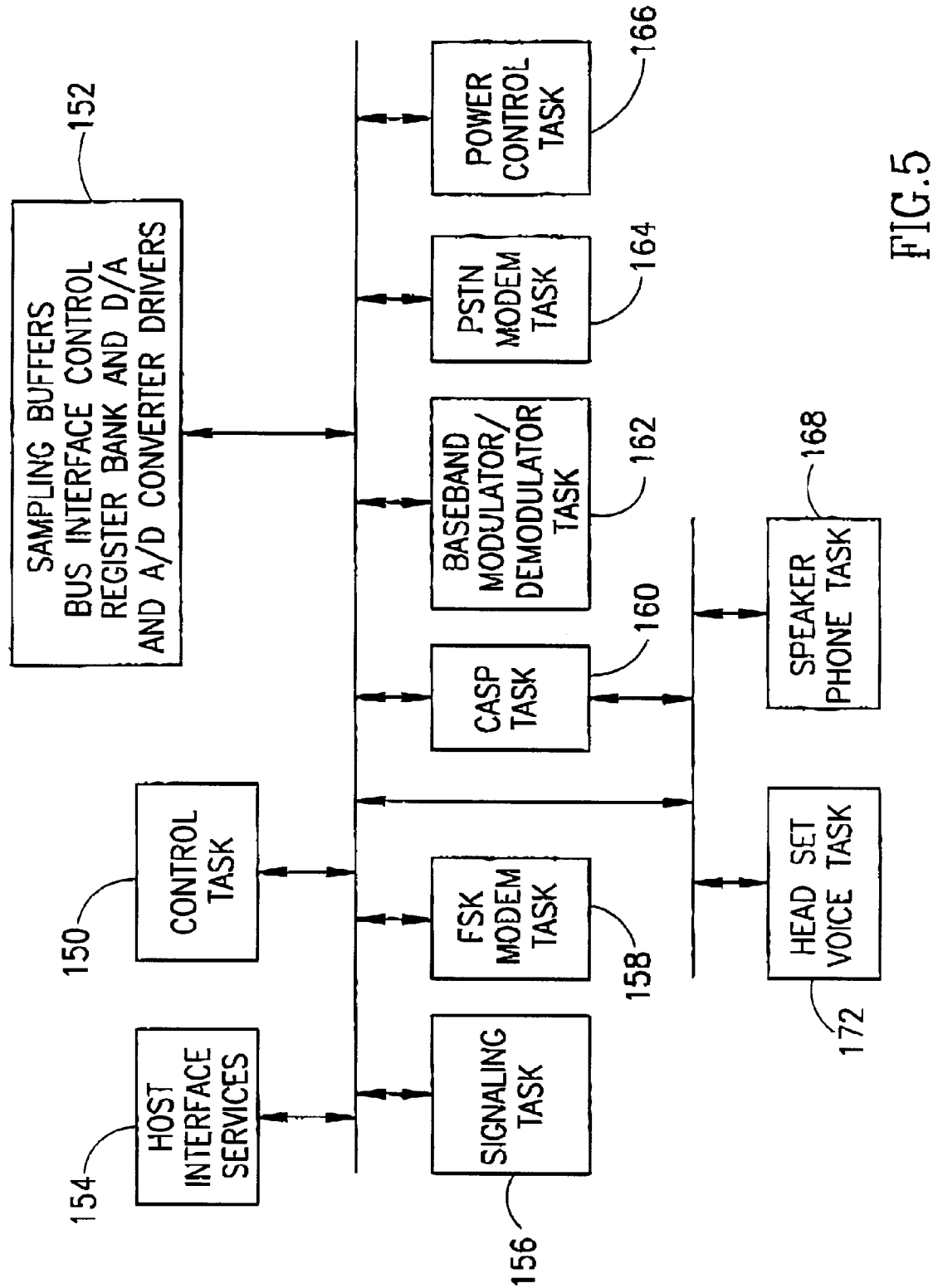
FIG. 5 is a block diagram illustrating the software functionality incorporated in the cellular subscriber unit of the present invention which utilizes host signal processing.

A block diagram illustrating the software functionality incorporated in the cellular subscriber unit of the present invention which utilizes host signal processing is shown in FIG. 5. The hardware interface is represented by task block 152. This task handles the sampling buffers, bus interface control, hardware control and status, register bank and D/A and A/D converter drivers. The remaining software tasks communicate with the hardware using services provided by task block 152.

The control task 150 implements the primary state machine. This task controls the RF operation of the device, e.g., setting the RF channel for a call, provides control functionality over the software realization of the AMPS cellular standard, sets the configuration of the ware and communicates with host applications and the operating system using the host interface services task 154.

The signaling task 156 provides tone generation and detection services for the cellular standard, e.g., supervisory audio tone (SAT) detection and regeneration, signaling tone (ST) generation transmitted by the subscriber unit for control purposes, call progress and DTMF functions for the ground line mode of operation.

The FSK modem task 158 realizes the wide band data modem described in the AMS cellular standard. The Cellular Audio Signals Processor (CASP) 160 task provides the audio frequency signal processing operations, as described in more detail in the cellular standard. These operations include compressing, pre-emphasis, deviation limiting, de-emphasis, expander, muting, etc.

The baseband modulator and demodulator task 162 provides optional baseband detection and modulation services for flexibility in upgrading and/or enhancing multi-mode operation. Modulation services include baseband representation of the modulated signal.

The PSTN modem task 164 operates in either ground line or cellular mode. In cellular mode it operates with special optimizations and protocols to yield more efficient cellular data communications. The PSTN block provides standard telephony modulations such as ITU-T V.32bis, V.34, etc. It is assumed that other modem related tasks including user interface, error correction, compression, ITU-T T.4, T.30, data over voice, etc. are performed by the host using standard communication applications. The power control task 166 monitors the readings of the battery including the power radiated by the antenna and provides processed information to the control task 150. Note that a wireless data modem product may be powered by the battery located in the host or it may comprise its own battery separate from that of the host. Task 166 does not monitor the battery if the wireless data modem product uses the host battery or the utility AC electrical supply. In this case, the monitoring is performed by the host itself. The control task 150 provides decisions on shutdowns and/or the placement of components and tasks into the power save mode.

The head set voice task 172 provides volume, mute, bass and treble control for the user. It also provides sample buffering functionality. Speakerphone task 168 provides half duplex or full duplex functionality. In half duplex mode, only the dual talk detector, echo return loss calculations and variable gain functions are active. This mode of operation provides acceptable quality with very low CPU utilization. In full duplex mode an acoustic echo canceler and an improved dual talk detector are added. Another echo canceler is not needed since the RF link is four wire in nature. In ground line mode, an electric echo canceler is added to handle the echo that results from the impedance mismatch in the hybrid with the DAA. Full duplex speakerphone provides the best quality but exhibits high CPU utilization for the canceler filter and coefficient update operations.

Cellular Communication System Incorporating Hardware Baseband Control

Figure 6:
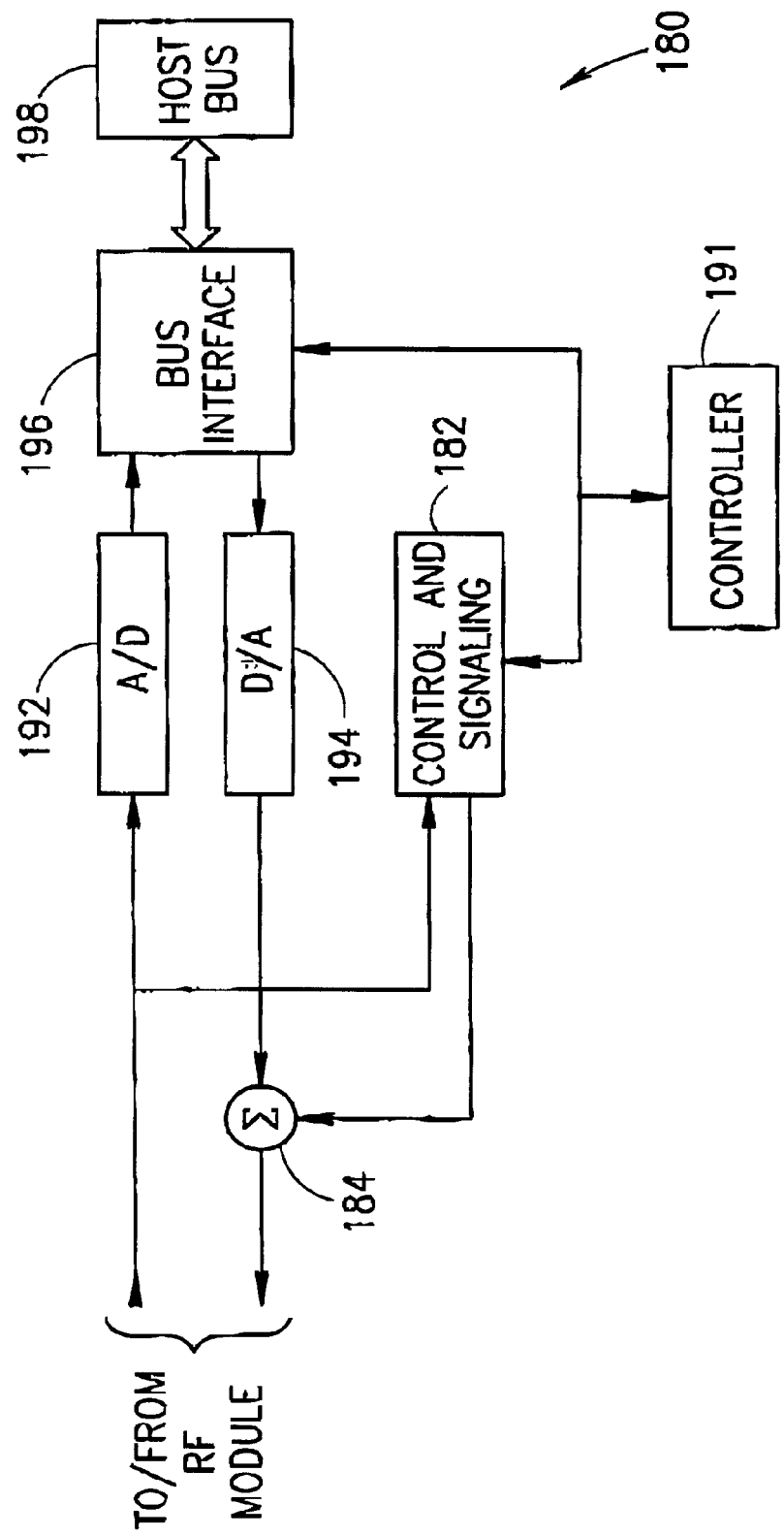
FIG. 6 is a block diagram illustrating a telephony modem constructed in accordance with a second embodiment of the present invention wherein the baseband portion is implemented using dedicated hardware.

A block diagram illustrating a telephony modem constructed in accordance with a second embodiment of the present invention wherein the baseband portion is implemented using dedicated hardware is shown in FIG. 6. The second embodiment of the cellular device of the present invention presents a cellular functionality realized by hardware. Transmit and receive data sent over the cellular link is transferred via a software based host telephony modem functionally equivalent to the PSTN modem task 164 (FIG. 5).

The receive audio signal from the RF module is input to the A/D converter 192 and the control and signaling unit 182. The control and signaling unit 182 functions to encode and generate control and signaling audio tone signals and to the receive and decode control and signaling information from the receive audio signal both in accordance with the cellular protocol in use. The control and signaling unit 182 performs these signal processing tasks for the controller 191, since the controller in this embodiment is implemented in hardware. Among its other tasks, the controller 191 performs channel allocation and control functions.

The control and signaling information is output by the control and signaling unit 182 to the controller 191 over the bus connecting the two. The control and signaling unit 182 performs modulation and demodulation functions as required to generate the receive the control and signaling information, in accordance with the cellular protocol, e.g., AMPS, and one or more modem standards.

The voice based data destined for the RF module is received from the host via the bus interface 196 and converted to an analog signal by D/A converter 194. The resulting analog signal is summed with the output of the control and signaling unit 182 via adder 184. The signals output from the data and signaling unit are combined with the voice audio signal output of the D/A converter 194 in accordance with the cellular standard.

In the second embodiment shown in FIG. 6, a single converter is required each for the cellular receive and transmit signal paths. Note that in the case of baseband audio sampling only a V.34 grade codec is required for the A/D and D/A converters. The conversion of cellular control and status signals is handled by the control and signaling unit 182.

The bus interface 196 is optionally a low cost bus interface which provides only the control lines and the necessary circuitry for sampling operations to occur, since the controller is implemented in hardware.

Figure 7:
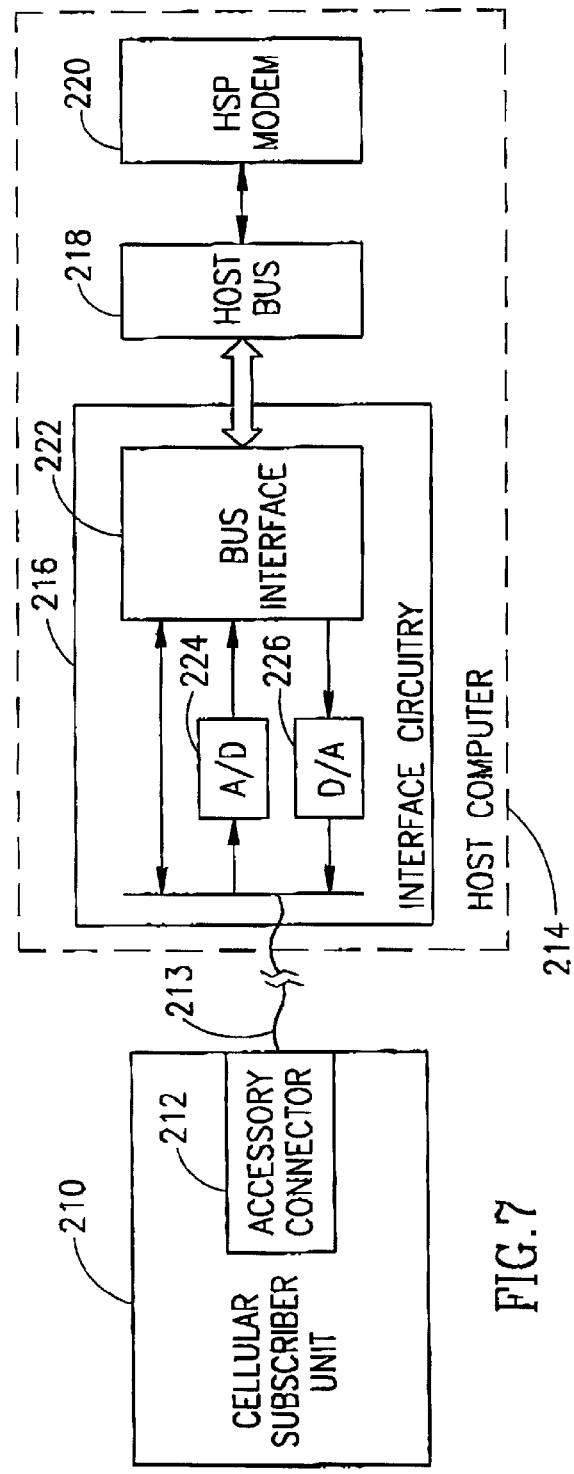
FIG. 7 is a block diagram illustrating a telephony modem constructed in accordance with a third embodiment of the present invention which utilizes Host Signal Processing and a cellular subscriber unit.

A block diagram illustrating a telephony modem constructed in accordance with a third embodiment of the present invention which utilizes a cellular subscriber unit in combination with host signal processing is shown in FIG. 7. In this third embodiments the cellular subscriber unit 210 is separated from the telephony modem 220 realized on the host computer 214. A host based software modem 220 receives and transmits data over a cable connection 213 between a computer 214, e.g., a hand held computer or PDA, and the cellular subscriber unit 210 via an accessory connector 212. Note that the hardware functionality contained on the interface circuitry 216 can be implemented in a PCMCIA or equivalent card adapted to receive signals from a conventional cellular subscriber unit 210. The cellular subscriber unit 210 may communicate over the cable 213 to a serial port or a parallel port within the interface circuitry216. The interface circuitry can be adapted to receive any type of serial connection such as RS-232, USB, RS-485, etc. or can be adapted to receive any type of parallel connection Centronics, etc.

The cellular subscriber unit 210 may comprise any cellular transceiver able to transmit and receive a wireless cellular signal. In addition, the interface circuitry 216 is adapted to interface electrically to the cellular subscriber unit 210 in accordance with the particular electrical specifications of the unit 210. Likewise, the interface circuitry 216 is adapted to implement the particular protocol of the cellular subscriber unit 210.

The HSP modem 220, which functions similarly to the PSTN task 164 (FIG. 5), is connected to a dedicated hardware bus interface 222 coupled, in turn, to the host bus 218. The bus interface hardware 222 performs control operations necessary for interfacing both the external cable connection 213 and the host bus 218 in the computer 214.

The A/D converter 224 functions to convert the received analog audio signal to a digital sample stream. The D/A converter 226 functions to convert the digital transmit sample stream to an analog audio signal. The external cable 213 is adapted to carry the audio, control and status signals between the host computer 214 and the cellular subscriber unit 210.

Cellular Communication System Incorporating Host Eased Modem

Figure 8:
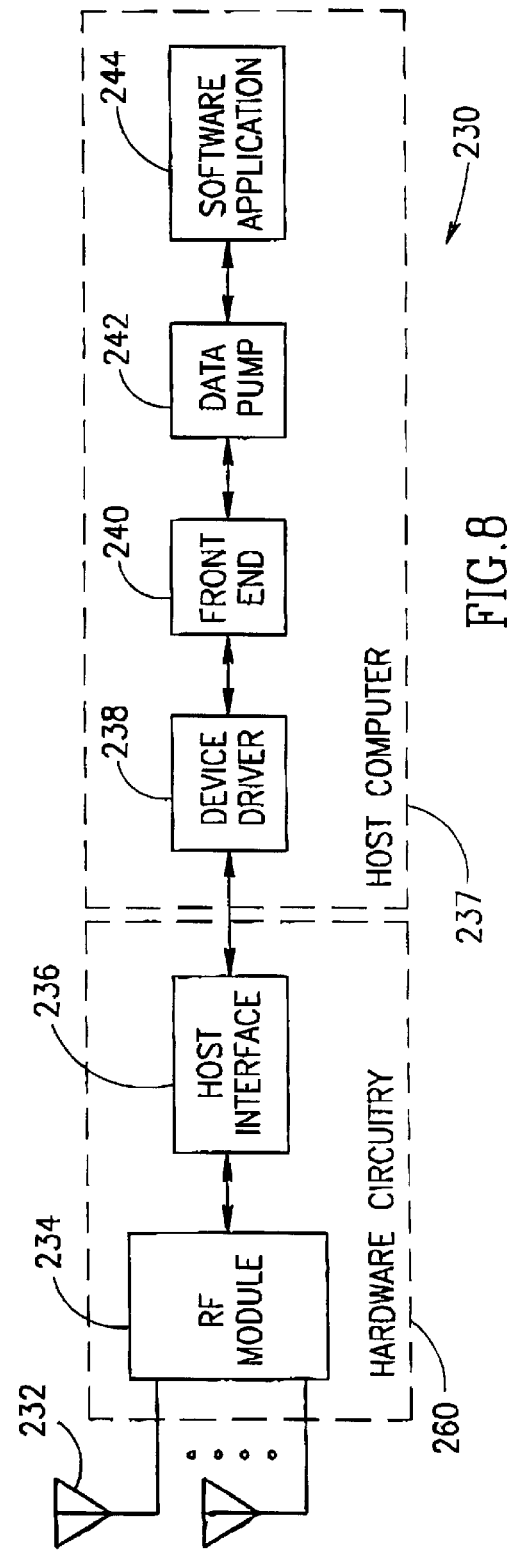
FIG. 8 is a block diagram illustrating an analog cellular communication system (ACCS) tuned for data communication.

A block diagram illustrating a high performance HSP modem operating over an analog cellular communication system (ACCS) tuned for data communication is shown in FIG. 8. The block diagram highlights the signal processing aspects of such a cellular communication system. The hardware platform portion of the system, generally referenced 230, comprises the hardware circuitry 260. The hardware circuitry 260 comprises an RF portion 234 and a bus interface 236. The hardware circuitry 260 may be adapted to fit on a standard internal computer card or a PCMCIA card, for example, so as to be compatible with the majority of commodity type computer products.

One or more antennas 232 may be connected to the RF module 234. If two or more antennas are connected, antenna diversity can be implemented. Antenna diversity, i.e., space diversity, functions to improve performance in environments with multipath fading. The RF module 234 may optionally include baseband control and signal processing functionality, If included, the computation burden is shared between the dedicated hardware platform and the host computer. The issue of apportioning the processing load between the HSP functions and the dedicated hardware was discussed previously above.

The host interface 236 comprises A/D and D/A converters, bus interface for configuration and data transfers, host communication means, nonvolatile memory, DMA and interrupt handling, power down handling, etc. The host interface 236 functions similarly to the interface circuitry 216 (FIG. 7).

The device driver 238 performs low level tasks such as handling the signals read and written between the host computer 237 and the hardware circuitry 260. The device driver reads in samples from and writes samples to the hardware circuitry 260. It also accesses events and passes inputs samples to the front end 240. The device driver is adapted to handle data transfers, configuration operations and the linking of low level physical entities to abstract software layers.

The front end processes the sample signals received from the device driver, regardless of whether the signals represents an audio baseband signal, IF sampled signal or complex baseband I and Q signals. The front end 246 implements signal processing functions which perform diversity combining (if two or more antennas are connected to achieve space diversity), filtering, demodulation and decimation functions.

The signal output by the front end 240 after processing is similar to the original signal after a linear transformation. After front end processing, the signal is further processed by a data pump 242 which implements a voice band modem that supports one or more PSTN modern recommendations such as V.32, V.34 or V.90. Finally, the data output of the data pump 242 is input to the software application 244 running on the host computer 237.

Hardware Circuitry

Figure 9:
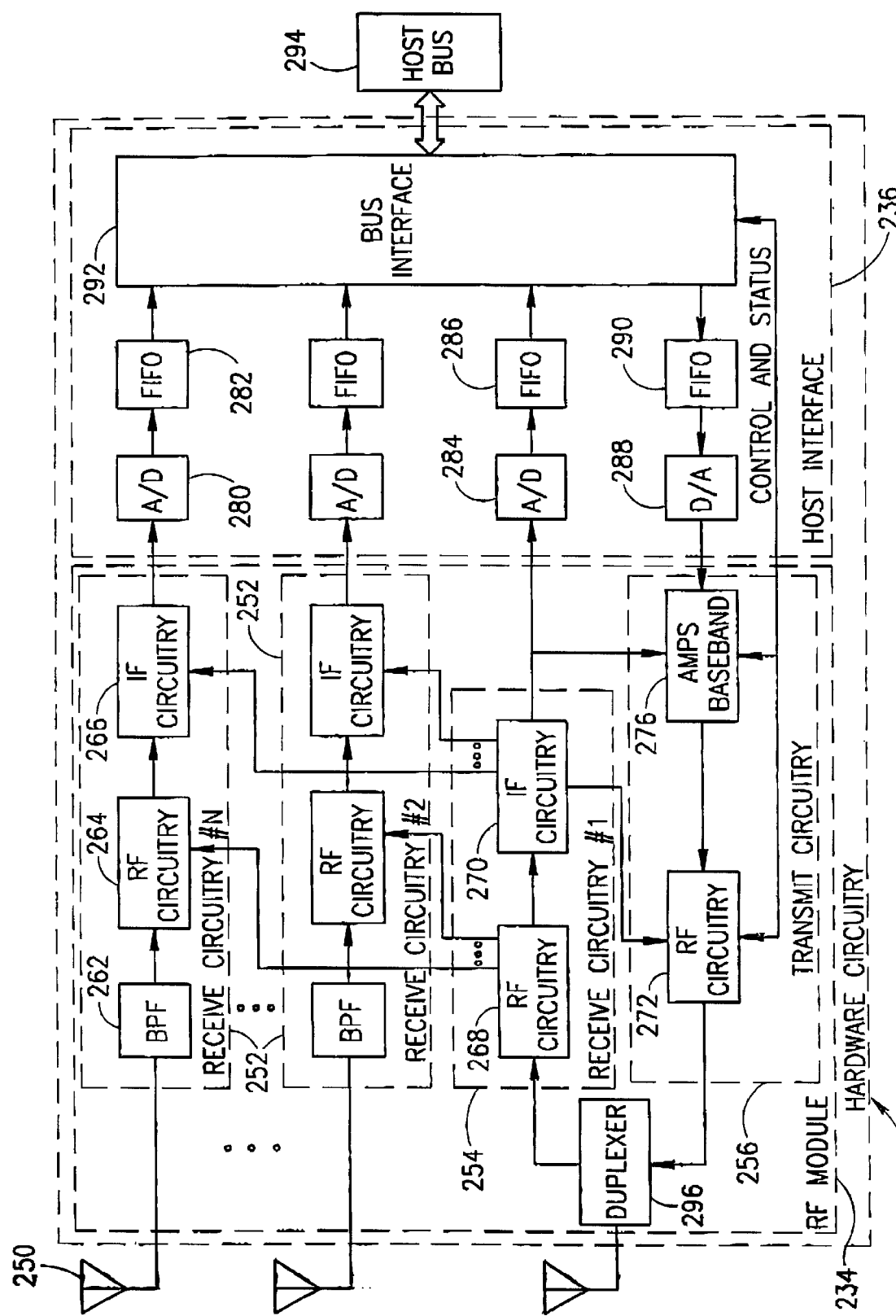
FIG. 9 is a block diagram illustrating the RF module and hardware interface circuitry components of a cellular communication system that utilizes host signal processing.

A block diagram illustrating the RF and interface components of a cellular communication system that utilizes host signal processing is shown in FIG. 9. The hardware platform comprising hardware circuitry 260 is made up of three basic sections: (1) the host interface 236, (2) RF module circuitry 234 consisting of transmit circuitry 256 and receive circuitry #1 254 through #N 252 and (3) antenna apparatus 250. The host interface 236, particularly the bus interface 292, functions as a bridge between the host bus 294, i.e., conventional PC bus, and the cellular transceiver, i.e., transmitter and receiver circuitry, within the RF module. The status requests and commands from the host are formatted by the bus interface 292 in accordance with the cellular baseband control and status interface.

Baseband module 276 is used by a host application to initiate or terminate a call, to indicate an incoming call event and to monitor cellular status and events such as signal strength, channel allocations etc. During a call, the host interface 236 transfers samples from the memory within the host to the D/A converter 288, and from the A/D converters 280, 284 to the host memory on a continuous and simultaneous basis.

The sample FIFOs 282, 286, 290 function to compensate for the latencies of the host bus 294. The transfer of samples between the device and the host is preformed without intervention from the host CPU. One exception is interrupt signaling which is used to indicate a processing frame boundary.

The RF module 234 comprises transmit circuitry 256, receive circuitry #1 254 and zero or more receive circuitry modules 252 labeled #2 through #N. The transmit circuitry 256 receives analog data from D/A converter 288 on the host interface 236. The data is input to baseband module 276 which serves to control cellular related functions and to process the low frequency signals. The transmit circuitry 256 also comprises RF circuitry 272 which upconverts the signal output of the baseband unit 276 to a transmit wireless signal. Note that the baseband module 276 can be adapted to receive and process either an audio baseband signal, IF signal or complex baseband I and Q signals.

The main receive circuitry #1 254 comprises RF circuitry 268 and IF circuitry 270. The receive circuitry #1 receives the receive wireless signal from the duplexer 296 and either (1) demodulates the signal to an audio baseband signal (2) downconverts the signal to complex baseband I and Q signals or (3) downconverts the signal to an IF signal which is subsequently sampled.

Each of the receive circuitry modules #2 through #N 252 comprise a band pass filter 262, RF circuitry 264 and IF circuitry 266. Each receiver #2 through #N functions to either demodulate the receive wireless signal from its antenna to audio baseband or downconvert the receive wireless signal from its antenna to complex I and Q or an IF signal. The RF circuitry 268 in the main receiver provides the local oscillator signal for the $1^{st}$ IF stage in RF circuitry 264 in receivers #2 through #N. Each of the local oscillator signals generated by RF circuitry 268 is buffered and isolated from each other. In addition, the IF circuitry 270 in the main receive provides the local oscillator signal for the $2^{nd}$ IF stage in IF circuitry 266 in receivers #2 through #N. Each of the local oscillator signals generated by IF circuitry 270 is buffered and isolated from each other.

The duplexer 296 functions to combine the outgoing transmit signal from RF circuitry 272 with the incoming receive signal input to RF circuitry 268 utilizing frequency separation. The diversity receive path through receivers #2 through #N is identical to the receive path through receive #1 254 with two modifications: (1) the signal received from the antenna is input to a band pass filter (BPF) 262 rather than a duplexer, since no signal is transmitted by the diversity antennas, and (2) the diversity receivers #2 through #N are synchronized to the local oscillators in RF circuitry 268 and IF circuitry 270 of the main receiver 254.

The plurality of antennas 250 function as the transducer element between the electromagnetic field in free space and the RF transmit and receive modules. Each of the antennas 250 may comprise a simple antenna or a complex antenna structure. Utilizing two or more antennas coupled to receivers #2 through #N enables the implementation of an antenna diversity scheme. Diversity in a communications receiver serves to enhance the overall bit error rate (BER) performance since it reduces the probability of faded (poor) signal at the antenna terminals. A simplified implementation without antenna diversity can be implemented in a straight forward manner by eliminating receivers #2 through #N. Implementing antenna diversity may be accomplished using numerous schemes, e.g., polarity diversity, field diversity, etc., all of which utilize the same structure with changes only to the antenna apparatus itself and its electrical interface to the hardware platform.

Figure 10:
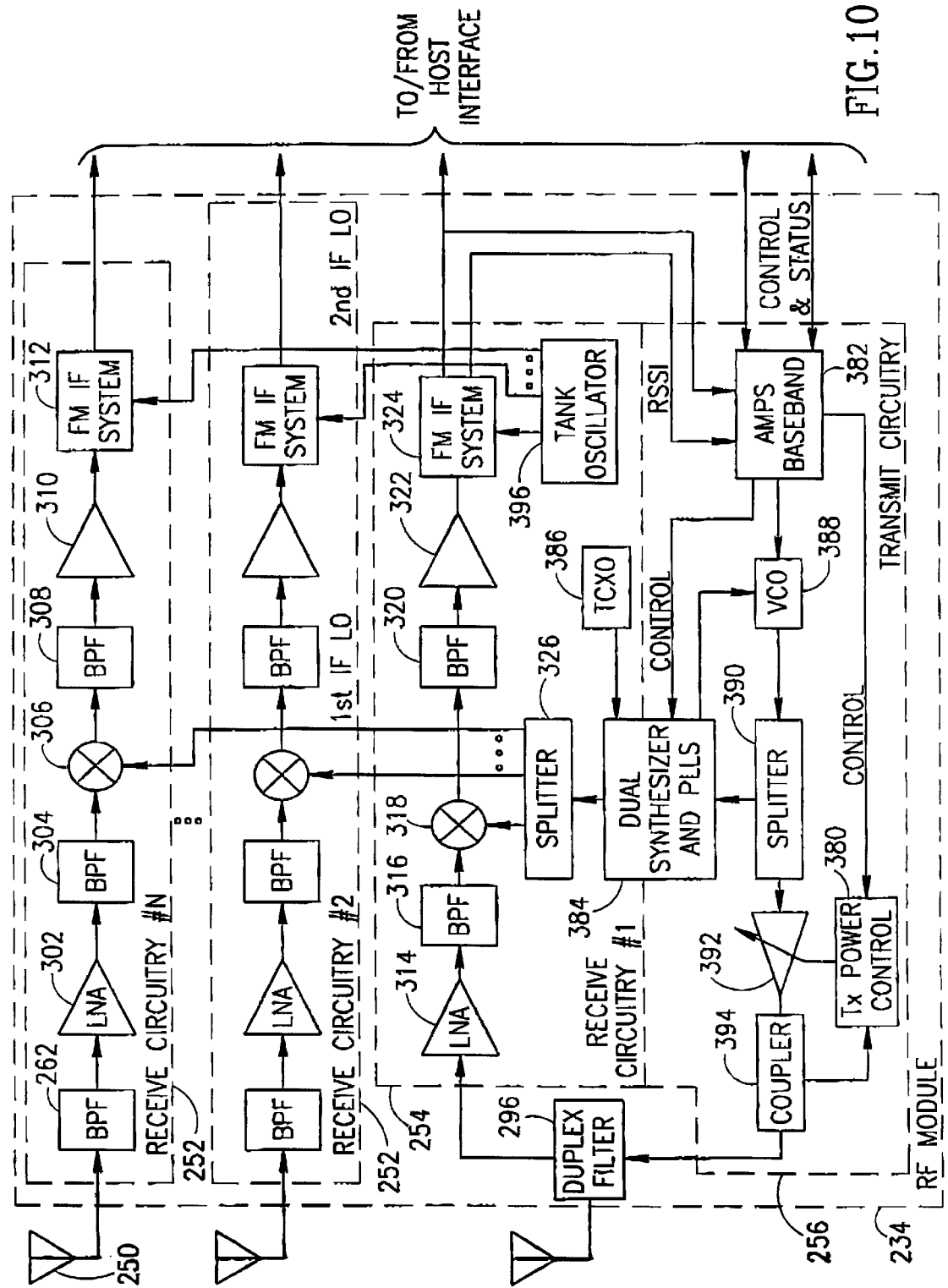
FIG. 10 is a block diagram illustrating the RF module portion of the cellular communication system of the present invention in more detail.

A block diagram illustrating the RF portion of the cellular communication system of the present invention is shown in FIG. 10. To aid in understanding the principles of the present invention an example based on the AMPS cellular standard will be presented. Note, however, that the circuit presented in similar to the RF portions of other cellular standards as well. The RF modules 234 can be used to construct the RF module 124 shown in FIG. 4.

The RF module 234 comprises transmit circuitry 256, receive circuitry #1 254 and receive circuitry #2 through #N 252. The transmit circuitry 256 receives an analog data signal from the host interface which is input to the baseband unit 382. The baseband unit 382 also communicates control and status information to and from the bus interface 292 in the host interface 236 (FIG. 9). The baseband unit 382 can be adapted to implement a cellular standard such as AMPS.

The baseband signal output of the baseband unit is input to VCO 388 which functions to output a signal frequency modulated in accordance with the baseband signal input to the VCO. A splitter 390 outputs the signal to a power amplifier 392 and the synthesizer/PLL 384. The output of the power amplifier is input to a coupler 394 which feeds the transmit wireless signal to the duplex filter 296 and also couples a portion of the output signal to the Tx power control unit 380. The duplex filter couples the transmit wireless signal to the antenna The dual synthesizer and PLLs module 384 is shared between the transmitter and main receiver. The synthesizer is adapted to receive control information from the baseband unit 382 and to output a control signal the VCO 388. A temperature compensated crystal oscillator (TCXO) 386 provides the frequency reference for the module 384.

The main receiver receives the receive wireless signal from the antenna, through the duplex filter 296 and into the low noise amplifier (LNA) 314. The output of the LNA is filtered via band pass filter 316 before being input to the $1^{st}$ IF mixer stage. Mixer 318 downconverts the RF signal to the first IF stage which is typically in the range of 455 KHz for the AMPS cellular standard. The local oscillator signal for the mixer 318 is generated by the synthesizer/PLL module 384. The local oscillator signal is also used in the $1^{st}$ IF stages of receivers #2 through #N. A splitter 326 generates the plurality of buffered and isolated $1^{st}$ IF local oscillator signals for receivers #2 through #N.

The output of the mixer 318 is filtered via band pass filter 320, amplified by amplifier 322 and then input to the FM IF system 324 which functions to generate the receive signal which may comprise a baseband signal, sampled IF signal or complex baseband I and Q signals. A tank oscillator 396 generates the local oscillator signal for the second IF stage in the FM IF system 324. The $2^{nd}$ IF local oscillator signal from The tank circuit generates a plurality of buffered and isolated $2^{nd}$ IF local oscillator signals that are also used by the FM IF system modules 312 in receivers #2 through #N. The baseband signal output of the FM IF system 324 is input to the host interface. The FM IF system also generates an RSSI signal which is input to the baseband module 382 along with the baseband output signal.

The receiver circuits #2 through #N can optionally be used to implement a diversity scheme. Each receiver 252 has an associated antenna 250. The receive wireless signal from the antenna is filtered by band pass filter 262 and then input to LNA 302. The output of the LNA is filtered by band pass filter 304 and then input to the $1^{st}$ IF mixer stage. Mixer 306 downconverts the RF signal to the first IF stage which is typically in the range of 455 KHz for the AMPS cellular standard. The local oscillator signal for the mixer 306 is generated by the synthesizer/PLL module 384 in the main receiver.

The output of the mixer 306 is filtered via band pass filter 308, amplified by amplifier 310 and then input to the FM IF system 312 which functions to generate the receive baseband signal. The tank oscillator 396 in the main receiver generates the local oscillator signal for the second IF stage in the FM IF system 312. The baseband signal output of the FM IF system 312 is input to the host interface.

Signal Processing Front End And Data Pump

Figure 11:
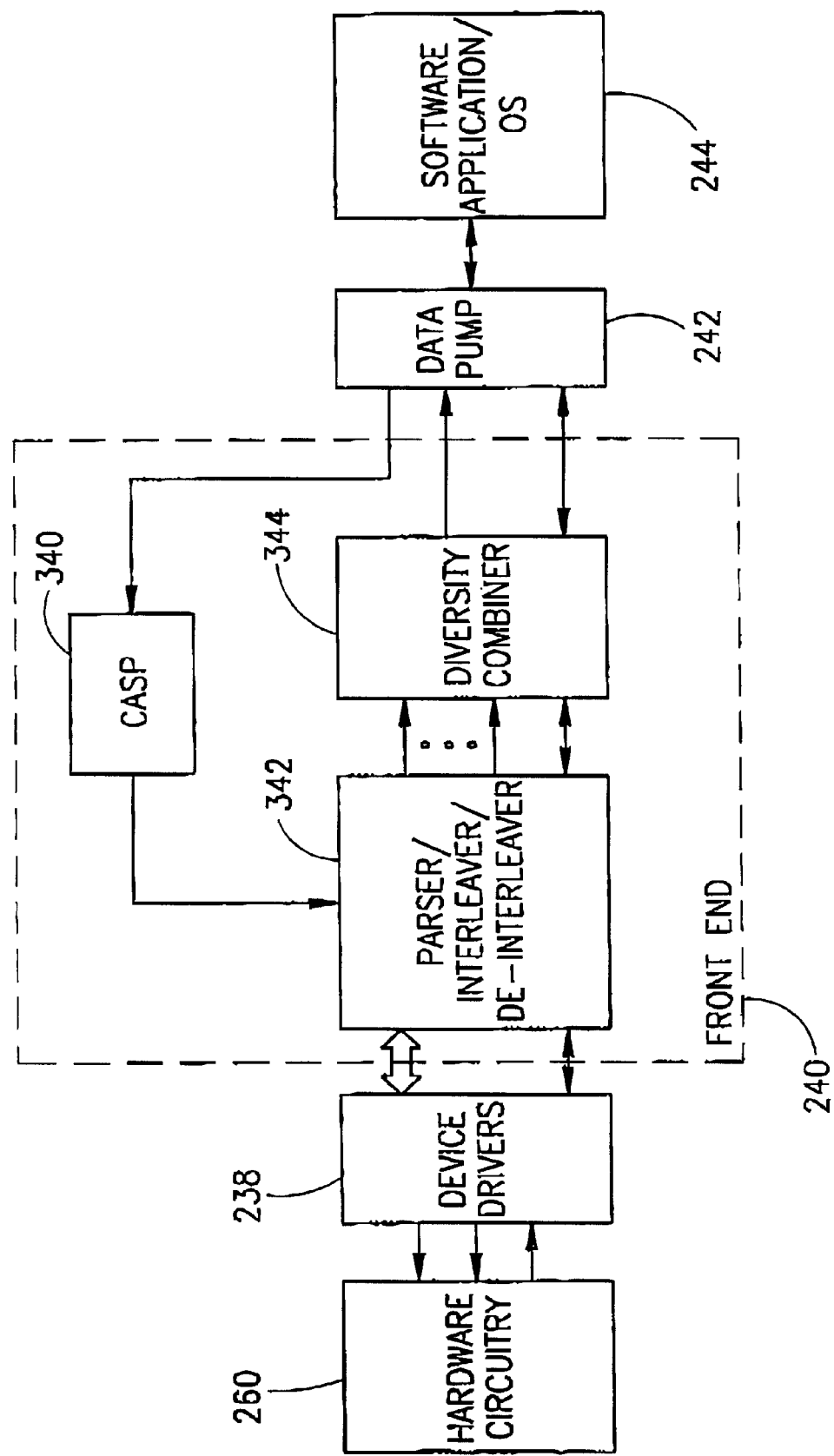
FIG. 11 is a block diagram illustrating a first embodiment of the host signal processing front end portion of the cellular communication system in more detail.

A block diagram illustrating a first embodiment of the host signal processing front end portion of the cellular communication system is shown in FIG. 11. The function of the front end module, generally referenced 240, is to interface the hardware, such as on the hardware circuitry 260, to the data pump 242 via the device driver 238. The front end 240 functions to provide a steady stream of data samples representing a demodulated signal to the data pump 242 and to perform event handling. The front end 240 can be used in the case when audio baseband data is input to and output from the hardware circuitry.

The device driver 238 communicates both data and control and status information with the parser/interleaver/de-interleaver 342. The bi-directional signal arrows signify the flow of control and status information. The device driver 238 has full access to the registers and control lines on the hardware circuitry 260. The parser functions to transform the hardware related format of the samples and event messages received from the hardware to a software related format. The parser also indicates the occurrence of events via messages incorporating headers sent within the data stream so as to synchronize the data with event occurrences.

The de-interleaver functions to remove the message headers from the data and to de-interleave the data received from all antennas, if antenna diversity has been implemented. The plurality of receive signals output from the parser/de-interleaver is enhanced by the diversity combiner 344 utilizing any suitable well known combining technique. The combining function can be performed using any suitable method such as described in Chapters 9 and 10 of William C. Y. Lee, Mobile Communications Engineering, Second Edition, McGraw Hill, Inc., 1998, incorporated herein by reference. The diversity combiner 344 functions to significantly reduce the probability of performance degradation occurring due to deep fading. The diversity combiner is adapted to receive a plurality of channels each channel comprising a stream of sample data associated with an antenna and receive circuitry module (FIG. 9).

The data samples to be transmitted, output by the data pump 242, are processed in the cellular audio signal processor (CASP) 340 where the functions including pre-emphasis, compressor, limiter, etc. are performed on the data before being parsed and framed by the parser 342. An interleaver functions to append message headers to the data.

The device driver 238 communicates both data and control and status information with the parser/interleaver/de-interleaver 402. The bi-directional signal arrows signify the flow of control and status information. The parser functions to transform the hardware related format of the samples and event messages received from the hardware to a software related format. The parser also indicates the occurrence of events via messages incorporating headers sent within the data stream so as to synchronize the data with event occurrences.

The de-interleaver functions to remove the message headers from the data and to de-interleave the data received from all antennas, if antenna diversity has been implemented. The plurality of receive signals output from the parser/de-interleaver is enhanced by the diversity combiner 404 utilizing any suitable well known combining technique. The combining function can be performed using any suitable method such as described in Chapters 9 and 10 of William C. Y. Lee, Mobile Communications Engineering, Second Edition, McGraw Hill, Inc., 1998, incorporated herein by reference. The diversity combiner 404 functions to significantly reduce the probability of performance degradation occurring due to deep fading. The diversity combiner is adapted to receive a plurality of channels each channel comprising a stream of sample data associated with an antenna and receive circuitry module (FIG. 9).

The signal output of the diversity combiner 404 is then demodulated via the demodulation/decimation module 406. Depending on the data received from the hardware circuitry, the demodulator functions to demodulate either the received IF signal or the received complex baseband I and Q signals to an audio baseband signal. The resulting audio baseband signal is subsequently decimated in time via the decimator portion of module 406.

In most FM communication systems, the FM signal bandwidth is much wider than the voice bandwidth. Thus, decimation of the signal performed by module 406 yields a signal that more efficiently utilizes CPU aid memory resources. The output signal decimated in time is output to the data pump 242 which sends and receives data to and from the software application 244.

In the transmit direction, the data samples to be transmitted are output by the data pump 242 and processed first by the cellular audio signal processor (CASP) 408 where the functions including pre-emphasis, compressor, limiter, etc. are performed on the data. The output of the CASP 408 is then processed by the transmit modulator 410. The transmit modulator functions to modulate the audio baseband signal output of the CASP to either an IF signal or to complex baseband I and Q signals, depending on the type of signal to be output to the hardware circuitry. The output of the transmit modulator 410 is then parsed and framed by the parser 402. An interleaver function to append message headers to the data.

Figure 12:
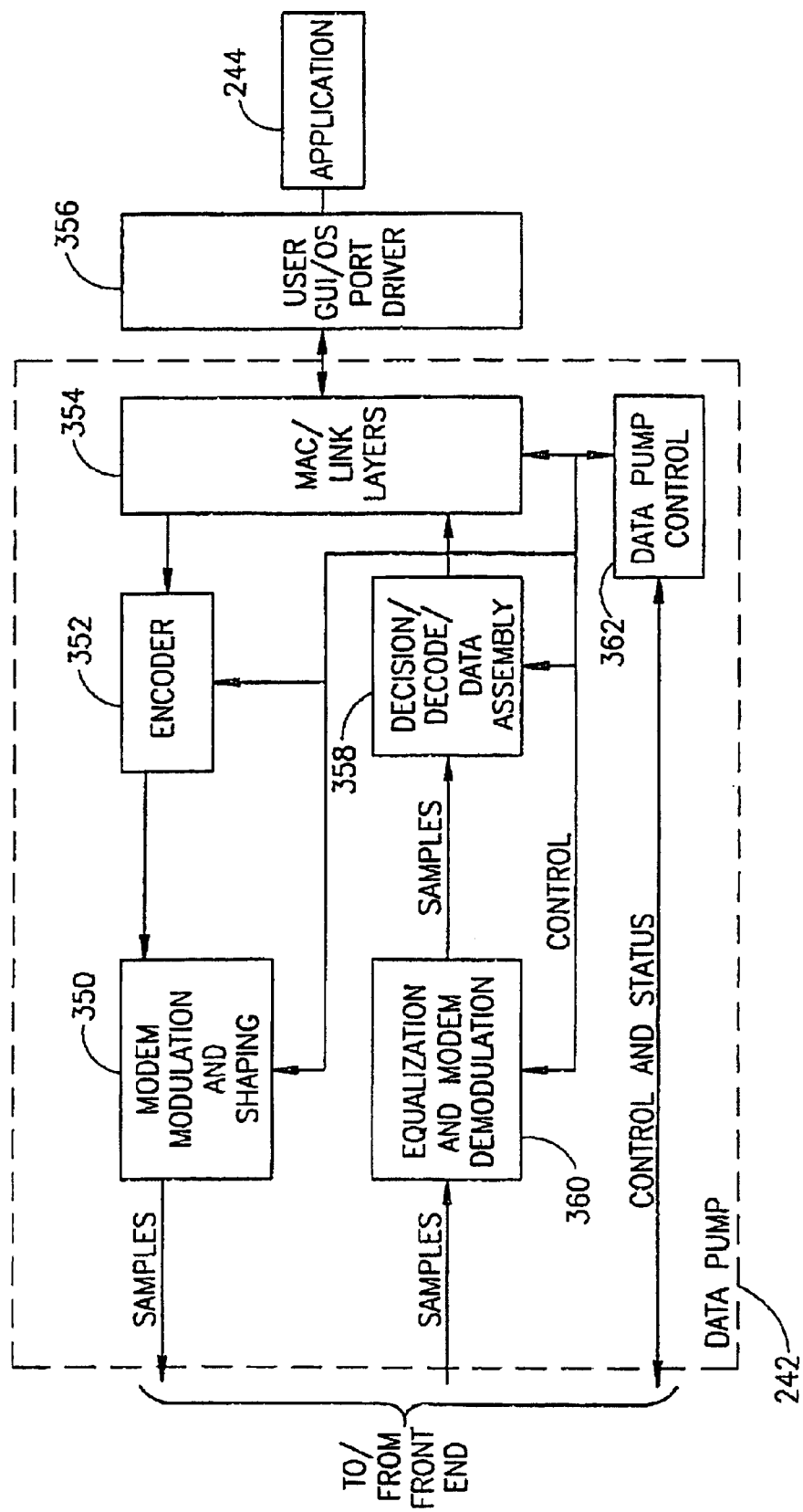
FIG. 12 is a block diagram illustrating the HSP analog modem portion of the cellular communication system in more detail.

A block diagram illustrating the analog modem portion of the cellular communication system in more detail is shown in FIG. 12. The data pump 242 is adapted to communicate with the front end on one side and the user GUI/OS port driver 356 on the other. A primary feature of the present invention is that both the data pump 242 and front end module 240 are implemented in HSP rather than on a dedicated DSP in hardware.

On the transmit path, data to be transmitted is output of the software application 244 to the OS port driver 356 which passes the data to the MAC/link layer 354 in the data pump 242. The MAC/link layer performs error correction encoding and compresses the data before passing it to the encoder 352. The encoder functions to scramble, frame and encode the data bits received from the MAC/link layer 354 to symbol points on the constellation in accordance with the digital modulation standard used. The output of the encoder 352 is input to the modem modulator/shaper 350 which processes and modulates the data to tailor the output data for a specific channel in accordance with the particular cellular and modem standard used and outputs digital samples to the front end module.

On the receive path, sample data is received from the front end module and input to the equalization/modem demodulation module 360 which performs (1) equalization, e.g., linear equalization or decision feedback equalization (DFE) using filters, e.g., FIR, etc., in order to reduce intersymbol interference (ISI) and (2) modem demodulation. Further details on the operation and construction of equalizer module 360 including linear equalization and DFE can be found in Chapter 6 of John G. Proakis, Digital Communications, Second Edition, McGraw Hill, Inc., 1989, incorporated herein by reference.

Note that only data is processed by the equalizer, as control and status information from the front end is input to the data pump control module 362. The equalizer functions to inform the pump control module 362, of various parameters such as the signal to noise ratio (SNR) and other error quality measurements (EQMs) at the output of the equalizer.

The sample data output of the equalizer is input to decision/decode/data assembly module 358. This module performs functions including slicing, decoding and synchronization of the symbols that are received over the channel. It determines the most likely transmitted symbol and performs demapping and descrambling of the data to generate the original transmitted bit stream. A more detailed description of the operation and construction of the decision/decode/data assembly module can be found in Chapter 4 of John G. Proakis, Digital Communications, Second Edition, McGraw Hill, Inc., 1989, incorporated herein by reference.

The data pump control 362 comprises a state machine to control the flow of events during the startup and data phases. In addition, the data pump control functions to handle user requests. The data pump functions to dynamically modify parameters of the pump loops using the baseband module 382 (FIG. 10) and status and event messages from the front end module. The status and event messages include, for example, information concerning SNR fading, carrier to interference (C/I) ratio, RSSI, call handoff, etc.

In an alternative embodiment, the diversity combining can be performed in the data pump rather than in the front end module. In this case, the plurality of receive signal channels is preserved up to the output of the equalizer. The data path from the parser/interleaver/de-interleaver in the front end through to the equalizer must be replicated to accommodate the plurality of diversity channels. The diversity combining is performed on the output of the equalizer. This embodiment is preferred if the receive signal is at the input to the front end module is an audio baseband signal.

Note that transmit and receive signal combinations other than those presented above can be implemented. For example, the receive signal input to the front end may comprise an IF sampled signal while the transmit signal input to the hardware circuitry for transmission may comprise an audio baseband signal. A cellular communication system can be constructed that is within the scope of the present invention whereby the hardware circuitry generates any type of receive signal, i.e., audio baseband, IF sampled or I and Q, and the front end generates any type of transmit signal, i.e., audio baseband, IF sampled or I and Q.

while the invention has been described with respect to a limited number of embodiments, it will be appreciated that many variations, modifications and other applications of the invention may be made.

What is claimed is:

1. A cellular communication system, comprising:

antenna apparatus for transmitting a transmit wireless signal, said antenna apparatus for receiving a receive wireless signal;

radio frequency (RF) means for receiving and performing RF receive processing on said receive wireless signal to generate a receive signal, said RF means for performing RF transmit processing on a transmit signal and generating said transmit wireless signal therefrom;

host processing means adapted to communicate data, status and control information with said RF means via a bus, said host processing means comprising a first host based software application and a host based modem application, said host based modem application performing the method comprising the steps of:

receiving said receive signal generated by said RF module over said bus and generating receive data in response thereto for input to said software application; and receiving data output by said first software application and generating said transmit signal in response thereto, sending said transmit signal to said RF module over said bus, wherein said host processing means is capable of concurrently running a second host based software application.

2. A cellular communication system, comprising:

a plurality of antennas for receiving a plurality of receive wireless signals, one of said plurality of antennas for transmitting a transmit wireless signal;

radio frequency (RF) means for receiving and performing RF receive processing on said plurality of receive wireless signals to generate a plurality of receive signals, said RF means for performing RF transmit processing on a transmit signal and generating said transmit wireless signal therefrom;

host processing means adapted to communicate data, status and control information with said RF means via a bus, said host processing means comprising a first host based software application and a host based modem application, said host based modem application performing the method comprising the steps of:

receiving said plurality of receive signals generated by said RF module over said bus and generating receive data in response thereto for input to said software application; and receiving data output by said first software application and generating said transmit signal in response thereto, sending said transmit signal to said RF module over said bus, wherein said host processing means is capable of concurrently running a second host based software.

3. The system according to claim 1, wherein said RF receive processing comprises RF demodulation of said receive wireless signal and wherein said receive signal comprises a receive audio baseband signal.

4. The system according to claim 1, wherein said RF receive processing comprises downconversion of said receive wireless signal and wherein said receive signal comprises an intermediate frequency (IF) signal.

5. The system according to claim 1, wherein said RF receive processing comprises downconversion of said receive wireless signal and wherein said receive signal comprises complex baseband I and Q signals.

6. The system according to claim 2, wherein said RF receive processing comprises RF demodulation of said plurality of receive wireless signals and wherein said plurality of receive signals comprise a plurality of receive audio baseband signals.

7. The system according to claim 2, wherein said RF receive processing comprises downconversion of said plurality of receive wireless signals and wherein said plurality of receive signals comprise a plurality of intermediate frequency (IF) signals.

8. The system according to claim 2, wherein said RF receive processing comprises downconversion of said plurality of receive wireless signals and wherein said plurality of receive signals comprise a plurality of complex baseband I and Q signals.

9. The system according to claims 1 or 2, wherein said transmit signal comprises an audio baseband signal and wherein said RF transmit processing comprises RF modulation to said transmit wireless signal.

10. The system according to claims 1 or 2, wherein said transmit signal comprises an intermediate frequency (IF) signal and wherein said RF transmit processing comprises upconversion to said transmit wireless signal.

11. The system according to claims 1 or 2, wherein said transmit signal comprises complex baseband I and Q signals and wherein said RF transmit processing comprises upconversion to said transmit wireless signal.

12. The system according to claims 1 or 2, wherein said host based modem application implements a cellular protocol.

13. The system according to claim 1, wherein said host based modem application is operative to generate said receive data in response to said receive signal generated by said RF module and to send said transmit signal to said RF module over said bus in accordance with predetermined signal processing methods.

14. The system according to claim 2, wherein said host based modem application is operative to generate said receive data in response to said plurality of receive signals generated by said RF module and to send said transmit signal to said RF module over said bus in accordance with predetermined signal processing methods.

15. The system according to claims 13 or 14, wherein said signal processing method comprises the steps of:

receiving an audio baseband signal;

de-interleaving said audio baseband signal;

performing diversity combining functions;

performing equalization functions;

performing modem demodulation functions; and decoding the results of said modem demodulation.

16. The system according to claims 13 or 14, wherein said signal processing method comprises the steps of:

receiving an IF sampled signal;

de-interleaving said IF sampled signal;

performing diversity combining functions;

demodulating said IF sampled signal to an audio baseband signal;

performing equalization functions;

performing modem demodulation functions; and decoding the results of said modem demodulation.

17. The system according to claims 13 or 14, wherein said signal processing method comprises the steps of:

receiving complex baseband I and Q signals;

de-interleaving said complex baseband I and Q signals;

performing diversity combining functions;

demodulating said complex baseband I and Q signals to an audio baseband signal;

performing equalization functions;

performing modem demodulation functions; and decoding the results of said modem demodulation.

18. The system according to claims 13 or 14, wherein said signal processing method comprises the steps of:

receiving a transmit data signal;

encoding said transmit data signal;

performing modem modulation functions;

performing cellular audio processing functions to yield an audio baseband signal;

interleaving the results of said cellular audio processing; and transmitting said interleaved audio baseband signal.

19. The system according to claims 13 or 14, wherein said signal processing method comprises the steps of:

receiving a transmit data signal;

encoding said transmit data signal;

performing modem modulation functions;

performing cellular audio processing functions;

performing IF modulation functions to yield an IF sampled signal;

interleaving the results of said IF modulation; and transmitting said interleaved IF sampled signal.

20. The system according to claims 13 or 14, wherein said signal processing method comprises the steps of:

receiving a transmit data signal;

encoding said transmit data signal;

performing modem modulation functions;

performing cellular audio processing functions;

performing I and Q modulation functions to yield complex baseband I and Q signals;

interleaving the results of said I and Q modulation; and transmitting said interleaved complex baseband I and Q signals.

21. The system according to claims 1 or 2, wherein said RF means comprises RF circuitry implemented on a printed circuit board (PCB) adapted to be installed in a computer.

22. The system according to claims 1 or 2, wherein said RF means comprises RF circuitry implemented on a PCM-CIA card adapted to be installed in a computer.

23. The system according to claims 1 or 2 wherein said bus comprises bus interface circuitry implemented on a printed circuit board (PCB) adapted to be installed in a computer.

24. The system according to claims 1 or 2 wherein said RF means comprises an external cellular transceiver coupled to a computer via a cable, said cable operative to connect said external cellular transceiver to bus interface circuitry within said computer.

25. The system according to claim 24, wherein said bus interface circuitry comprises a serial port.

26. The system according to claim 24, wherein said bus interface circuitry comprises a parallel port.

27. The system according to claims 1 or 2 wherein said RF means comprises an external cellular transceiver coupled to a computer via a cable, said cable operative to connect said external cellular transceiver to a parallel port within said computer.

28. The system according to claim 6, wherein said host based modem application implements diversity combining for combining said plurality of receive audio baseband signals.

29. The system according to claim 7, wherein said host based modem application implements diversity combining means for combining said plurality of receive IF signals.

30. The system according to claim 8, wherein said host based modem application implements diversity combining means for combining said plurality of receive complex baseband I and Q signals.

31. A cellular communication system, comprising:

a host, comprising:

processing means adapted to execute one or more software applications including a software application adapted to communicate data;

a device driver adapted to handle data transfers, configuration operations and the linking of low level physical entities within hardware interface circuitry to said host;

said hardware circuitry comprising:

antenna apparatus for transmitting a transmit wireless signal and for receiving one or more receive wireless signals;

radio frequency (RF) means for receiving and processing said one or more receive wireless signals to generate one or more receive signals, said RF means for modulating a transmit signal and generating said transmit wireless signal therefrom, said RF means transmitting said transmit wireless signal;

bus circuitry for interfacing data, status and control information between said RF means and a host;

wherein said host is adapted to communicate said data, status and control information to and from said RF means via said bus circuitry, said host suitably programmed to implement a host based modem, comprising:

a front end operative to process samples received from said device driver, perform diversity combining, filtering, demodulation and decimation functions; and a data pump operative to implement one or more standard voice band modems.

32. The system according to claim 31, wherein said RF means is adapted to receive and demodulate said one or more receive wireless signals to generate one or more receive baseband signals.

33. The system according to claim 31, wherein said RF means is adapted to receive and downconvert said one or more receive wireless signals to generate one or more receive complex baseband I and Q signals.

34. The system according to claim 31, wherein said RF means is adapted to receive and downconvert said one or more receive wireless signals to generate one or more receive intermediate frequency (IF) signals.

35. The system according to claim 31, wherein said RF means is adapted to modulate an audio baseband signal to yield said transmit wireless signal therefrom.

36. The system according to claim 31, wherein said RF means is adapted to upconvert complex baseband I and Q signals to yield said transmit wireless signal therefrom.

37. The system according to claim 31, wherein said RF means is adapted to upconvert an intermediate frequency (IF) sampled signal to yield said transmit wireless signal therefrom.

38. The system according to claim 31, wherein said antenna apparatus comprises a plurality of antennas for receiving a plurality of receive wireless signals.

39. The system according to claim 31, wherein said front end and said data pump are implemented utilizing host signal processing (HSP).

40. The system according to claim 31, wherein said host based modem is adapted to implement a cellular protocol.

41. The system according to claim 31, wherein said front end is adapted to perform diversity combining when said antenna apparatus is operative to receive a plurality of receive wireless signals.

* * * * *